(12) United States Patent
Das et al.

(10) Patent No.: US 9,781,610 B2
(45) Date of Patent: Oct. 3, 2017

(54) SMALL CELL CLUSTERS FOR SIGNALING LOAD REDUCTION, TIME SYNCHRONIZATION, KPI FILTERING AND SPECTRUM COORDINATION

(71) Applicant: QUALCOMM Incorporated, San Diego, CA (US)

(72) Inventors: Soumya Das, San Diego, CA (US); Samel Celebi, Summit, NJ (US); Kaushik Chakraborty, San Diego, CA (US); Bongyong Song, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 14/133,510

(22) Filed: Dec. 18, 2013

(65) Prior Publication Data

US 2015/0173011 A1 Jun. 18, 2015

(51) Int. Cl.
*H04W 16/26* (2009.01)
*H04W 24/02* (2009.01)
(Continued)

(52) U.S. Cl.
CPC .......... *H04W 16/26* (2013.01); *H04W 16/02* (2013.01); *H04W 24/02* (2013.01); *H04W 84/045* (2013.01); *H04W 92/20* (2013.01)

(58) Field of Classification Search
CPC ..... H04W 40/32; H04W 84/18; H04W 84/20; H04W 40/02; H04W 40/246; H04W 28/06; H04W 4/06
See application file for complete search history.

(56) References Cited

U.S. PATENT DOCUMENTS

| 7,756,519 B2 | 7/2010 | Barak et al. |
| 7,894,371 B2 | 2/2011 | Bonta et al. |

(Continued)

FOREIGN PATENT DOCUMENTS

| WO | WO-2012158578 A1 | 11/2012 |
| WO | WO-2013138521 A1 | 9/2013 |

OTHER PUBLICATIONS

Hosseini K., et al., "Distributed clustering and interference avoidance in cognitive femtocell networks", Information Sciences and Systems (CISS), 2012 46th Annual Conference on, IEEE, Mar. 21, 2012 (Mar. 21, 2012), pp. 1-5, XP032241346, DOI: 10.1109/CISS.2012.6310717 ISBN: 978-1-4673-3139-5.

(Continued)

*Primary Examiner* — Noel Beharry
*Assistant Examiner* — Rodrick Mak

(57) ABSTRACT

A method of coordinating a small cell with a plurality of small cells includes estimating backhaul bandwidth and backhaul bandwidth utilization of the small cell; estimating aggregate bandwidth utilization for the small cell and the plurality of small cells based on the estimated backhaul bandwidth utilization for each of the small cells; selecting the small cell as a cluster head for a cluster of the small cells based on the estimated aggregate backhaul bandwidth utilization, the cluster including at least some of the small cells; and communicating, via the cluster head, information between a network entity and the small cells of the cluster.

11 Claims, 30 Drawing Sheets

(51) Int. Cl.
*H04W 16/02* (2009.01)
*H04W 84/04* (2009.01)
*H04W 92/20* (2009.01)

(56) References Cited

U.S. PATENT DOCUMENTS

| | | |
|---|---|---|
| 8,301,182 B2 | 10/2012 | Kim et al. |
| 2002/0167898 A1* | 11/2002 | Thang ............... H04L 45/02 370/216 |
| 2007/0225023 A1* | 9/2007 | Abusch-Magder ........... 455/515 |
| 2008/0068996 A1* | 3/2008 | Clave et al. .............. 370/230.1 |
| 2008/0080414 A1* | 4/2008 | Thubert et al. ............... 370/328 |
| 2008/0090575 A1* | 4/2008 | Barak ................ H04W 16/10 455/444 |
| 2008/0253286 A1* | 10/2008 | Shriram ............... H04L 41/147 370/232 |
| 2008/0261602 A1 | 10/2008 | Livneh et al. |
| 2008/0274745 A1* | 11/2008 | Barak ................ H04W 16/02 455/447 |
| 2009/0312027 A1 | 12/2009 | Foschini et al. |
| 2010/0042716 A1 | 2/2010 | Farajidana et al. |
| 2010/0113038 A1* | 5/2010 | Eskicioglu et al. .......... 455/446 |
| 2012/0039314 A1 | 2/2012 | Osborn et al. |
| 2013/0244682 A1* | 9/2013 | Schoenerstedt ............ 455/452.1 |
| 2014/0029584 A1* | 1/2014 | Qu et al. ....................... 370/336 |
| 2014/0153390 A1* | 6/2014 | Ishii et al. .................... 370/230 |
| 2015/0043390 A1* | 2/2015 | Wang ................... H04W 24/02 370/280 |
| 2015/0131475 A1* | 5/2015 | Van Phan ............ H04W 84/18 370/254 |
| 2015/0382272 A1* | 12/2015 | Carichner ............ H04W 88/10 370/338 |

OTHER PUBLICATIONS

International Search Report and Written Opinion—PCT/US2014/070410—ISA/EPO—Mar. 18, 2015.

* cited by examiner

SMALL CELL CLUSTERS FOR SIGNALING LOAD REDUCTION, TIME SYNCHRONIZATION, KPI FILTERING AND SPECTRUM COORDINATION

BACKGROUND

1. Field

The disclosure relates generally to wireless systems and methods, and, in particular, to systems and methods small cell cluster coordination.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional access points, additional access points (e.g., open, restricted, hybrid access points) can be deployed to provide more robust wireless coverage to mobile devices. For example, wireless relay stations and low power access points (e.g., which can be commonly referred to as Home Node Bs or Home eNodeBs, collectively referred to as H(e)NBs, femto access points, small cells, femtocells, picocells, microcells, etc.) can be deployed for incremental capacity growth, richer user experience, in-building or other specific geographic coverage, and/or the like. In some configurations, such low power access points can be connected to the Internet via broadband connection (e.g., digital subscriber line (DSL) router, cable or other modem, etc.), which can provide the back haul link to the mobile operator's network. Thus, for example, the low power access points can be deployed in user homes to provide mobile network access to one or more devices via the broadband connection.

As the demand for mobile broadband access continues to increase, research and development continue to advance heterogeneous network technology not only to meet the growing demand for mobile broadband access, but also to advance and enhance the user experience with mobile communications.

SUMMARY

A method of coordinating a small cell with a plurality of small cells includes, but is not limited to any one or combination of estimating backhaul bandwidth and backhaul bandwidth utilization of the small cell; estimating aggregate bandwidth utilization for the small cell and the plurality of small cells based on the estimated backhaul bandwidth utilization for each of the small cells; selecting the small cell as a cluster head for a cluster of the small cells based on the estimated aggregate backhaul bandwidth utilization, the cluster including at least some of the small cells; and communicating, via the cluster head, information between a network entity and the small cells of the cluster.

In various embodiments, the cluster head is selected based on the estimated aggregate backhaul utilization and at least one of (i) backhaul delay between the small cell and the other small cells of the cluster, (ii) a number of hops between the small cell and the other small cells of the cluster, (iii) a maximum allowed size of the cluster, and (iv) a number of user equipment context transfers between the small cell and the other small cells of the cluster.

In various embodiments, the network entity comprises a core network.

In various embodiments, the information is communicated for an application relating to one of (i) filtering key performance indicator for the small cells in the cluster, (ii) providing a local mobility anchor for the small cells in the cluster, (iii) time and/or frequency synchronization of the small cells in the cluster, and (iv) spectrum coordination of the small cells in the cluster.

In various embodiments, the estimated aggregate backhaul bandwidth utilization includes one of (i) control-plane data and (ii) control-plane data and user-plane data.

In various embodiments, the selecting a cluster head includes selecting a first cluster head for a first cluster of the small cells based on the estimated aggregate backhaul bandwidth utilization, the first cluster including a first set of the small cells; and selecting a second cluster head for a second cluster of the small cells based on the estimated aggregate backhaul bandwidth utilization, the second cluster including a second set of the small cells. The communicating includes communicating, via the first cluster head, information between the network entity and the small cells of the first cluster; and communicating, via the second cluster head, information between the network entity and the small cells of the second cluster.

In some embodiments, at least one of the small cells belongs to the first cluster and the second cluster.

In various embodiments, the selecting a cluster head includes selecting, for a first application, a first cluster head for the cluster based on the estimated aggregate backhaul bandwidth utilization; and selecting, for a second application, a second cluster head for the cluster based on the estimated aggregate backhaul bandwidth utilization, the first application different from the second application. The communicating includes communicating, via the first cluster head, information between the network entity and the small cells of the cluster for the first application; and communicating, via the second cluster head, information between the network entity and the small cells of the cluster for the second application.

In some embodiments, each of the first application and the second application relates to one of (i) filtering key performance indicator for the small cells in the cluster, (ii) providing a local mobility anchor for the small cells in the cluster, (iii) time and/or frequency synchronization of the small cells in the cluster, and (iv) spectrum coordination of the small cells in the cluster. The first application is different from the second application.

A method of coordinating among a plurality of small cells includes, but is not limited to any one or combination of forming a cluster of small cells; selecting a cluster head small cell from among the cluster of small cells based on one or more criteria of an application for implementing by the cluster head; and implementing, via the cluster head small cell, the application. The application relates to one of (i) filtering key performance indicator for the small cells in the cluster, (ii) providing a local mobility anchor for the small cells in the cluster, (iii) time and/or frequency synchronization of the small cells in the cluster, and (iv) spectrum coordination of the small cells in the cluster.

A method of coordinating among a plurality of small cells includes, but is not limited to any one or combination of forming a cluster of small cells based on one or more criteria; selecting a cluster head small cell from among the cluster of small cells based on the one or more criteria; and communicating, via the cluster head small cell, information between a network entity and the other small cells of the cluster.

In various embodiments, the one or more criteria includes at least one of backhaul bandwidth and backhaul bandwidth utilization for each of the small cells.

In various embodiments, the one or more criteria includes at least one of (i) aggregate backhaul bandwidth utilization of the small cells of the cluster; (ii) backhaul delay between the small cell and the other small cells of the cluster, (iii) a number of hops between the small cell and the other small cells of the cluster, (iv) a maximum allowed size of the cluster, and (v) a number of user equipment context transfers between the small cell and the other small cells of the cluster.

A method of managing mobility of a user equipment (UE) via a small cell includes, but is not limited to any one or combination of forming a cluster with at least one other small cell; selecting the small cell as a local mobility anchor (LMA) for the cluster; and communicating, via the LMA, data between a network entity and the small cells of the cluster.

In various embodiments, the network entity comprises one or more of a serving gateway (S-GW) and a mobility management entity (MME).

In various embodiments, the LMA is configured to communicate control-plane data and user-plane data between the network entity and the small cells of the cluster.

In various embodiments, the method further includes selecting a cluster head of the cluster. The cluster head is the LMA for the cluster.

In some embodiments, the communicating includes communicating, via the cluster head, data between a source small cell in the cluster and the network entity; receiving, at the cluster head, a path switch request from a target small cell in the cluster; and communicating, via the cluster head, packet data between the target small cell and the network entity, in response to the packet switch request.

In further embodiments, the communicating includes communicating, via the cluster head, packet data between a source small cell of the cluster and the network entity; and communicating, via the cluster head, packet data between a target small cell of the cluster and the network entity, in response to handover of a user equipment (UE) from the source small cell to the target small cell.

In further embodiments, each of the cluster head and one or more of a source small cell and a target small cell of the cluster is configured to allow tunneling of messages therebetween.

In further embodiments, each of the cluster head and one or more of a source small cell and a target small cell of the cluster implements a protocol to allow tunneling of messages therebetween.

In yet further embodiments, the messages comprises S1 application protocol messages.

In yet further embodiments, the messages are tunneled over X2 interface. In further embodiments, the communicating includes communicating, via a local gateway of a source small cell, packet data between the source small cell of the cluster and the cluster head.

In further embodiments, the cluster head communicates information between the small cells and the network entity via a small cell gateway.

In some embodiments, a source small cell in the cluster for handing over a user equipment to a target small cell in the cluster is the LMA for the cluster.

In some embodiments, the method further includes communicating packet data between the source small cell of the cluster and the network entity; and communicating, via the source small cell, packet data between the target small cell of the cluster and the network entity, in response to handover of a user equipment (UE) from the source small cell to the target small cell.

In various embodiments, the LMA is configured to communicate control-plane data only between the network entity and the small cells of the cluster.

In some embodiments, the method further including selecting a cluster head of the cluster. The cluster head is the LMA for the cluster.

In further embodiments, the communicating includes communicating, via a local gateway of a source small cell, packet data between the source small cell of the cluster and the cluster head.

In further embodiments, a state of the UE is stored in the cluster head.

In yet further embodiments, the state of the UE comprises at least one of a quality of service setting and a radio access bearer setting.

In some embodiments, a source small cell in the cluster is configured for handing over a user equipment to a target small cell in the cluster is the LMA for the cluster.

In further embodiments, the method further including communicating packet data between the source small cell of the cluster and the network entity; and communicating, via the source small cell, packet data between the target small cell of the cluster and the network entity, in response to handover of a user equipment (UE) from the source small cell to the target small cell.

A method of performing mobility management includes, but is not limited to any one or combination of providing a cluster of small cells; and providing a small cell cluster head for communicating data between the cluster of small cells and a network entity.

In various embodiments, the small cell cluster head is one of the small cells of the cluster.

In various embodiments, the small cell cluster head is not one of the small cells of the cluster.

In various embodiments, the small cell cluster head is coupled to a small cell gateway.

In various embodiments, the small cell cluster head comprises a small cell gateway.

In various embodiments, the network entity comprises one or more of a serving gateway (S-GW) and a mobility management entity (MME).

A method of coordinating a small cell with a plurality of small cells includes, but is not limited to any one or combination of forming a cluster with at least one other small cell; selecting the small cell as a cluster head of the cluster; and communicating, via the cluster head, at least one key performance indicator (KPI) of the cluster to a network entity.

In various embodiments, the network entity comprises an operations, administration, and maintenance entity.

In various embodiments, the at least one KPI comprises at least one KPI for the cluster.

In some embodiments, the at least one KPI corresponds to physical cell identity (PCI) collisions in the cluster, aggregate time average backhaul utilization for the cluster, aggregate time average radio resource utilization for the cluster, latency of the cluster, jitter of the cluster, handover (HO) statistics for the cluster, number of radio access bearer (RAB) setup failure to load, and paging success rate in the cluster.

In further embodiments, the HO statistics includes at least one of number of HO attempts; number of HO failures; number of premature HOs; and number of measurement gaps for inter-frequency HO.

In various embodiments, the KPI comprises at least one KPI for each of the small cells of the cluster.

In some embodiments, the at least one KPI corresponds to aggregate time average backhaul utilization for each of the small cells of the cluster and aggregate time average radio resource utilization for each of the small cells of the cluster.

In various embodiments, the cluster head is selected based on one or more criteria of an application for implementing by the cluster head.

In some embodiments, the one or more criteria includes at least one of backhaul bandwidth and backhaul bandwidth utilization for each of the small cells.

A method of performing handover includes, but is not limited to any one or combination of receiving, at a source small cell in a cluster of small cells, backhaul bandwidth and backhaul bandwidth utilization for each neighbor small cell in the cluster; receiving, at the source small cell, a report from at least one user equipment (UE) on radio link quality for each neighbor small cell in the cluster; and selecting, at the source small cell, a target small cell from the neighbor small cells in the cluster based on the backhaul bandwidth, backhaul bandwidth utilization, and the radio link quality for each of the neighbor small cells.

In various embodiments, the method further includes receiving, at the source small cell, radio resource utilization for each neighbor small cell in the cluster. The selecting the target small cell is based on the backhaul bandwidth, backhaul bandwidth utilization, radio resource utilization, and the radio link quality for each of the neighbor small cells.

In some embodiments, the selecting the target small cell includes computing for each of the neighbor small cells in the cluster a corresponding selection metric according to a relationship of min $\{(1-fbu_i)*fb_i, (1-fru_i)*fr_i\}$, where $fbu_i$ represents the percentage backhaul bandwidth utilization for an $i^{th}$ small cell; $fb_i$ represents the backhaul bandwidth for the $i^{th}$ small cell; $fr_i$ represents the radio link quality for the $i^{th}$ small cell; and $fru_i$ represents the radio resource utilization for the $i^{th}$ small cell; and selecting, as the target small cell, one of the neighbor small cells associated with the computed selection metric.

In various embodiments, the method further includes handing over the UE from the source small cell to the target small cell in response to selecting the target small cell.

A method of coordinating a small cell with a plurality of small cells includes, but is not limited to any one or combination of forming a cluster with at least one other small cell; selecting the small cell as a cluster head of the cluster; and communicating, via the cluster head, spectrum coordination information between a network entity and the small cells of the cluster.

In various embodiments, the spectrum coordination information allows a first small cell of the cluster to coordinate spectrum usage with a second small cell of the cluster.

In various embodiments, the network entity comprises an operations, administration, and maintenance entity.

In various embodiments, the communicating includes sending, via the cluster head, the spectrum coordination information from the network entity to the small cells of the cluster.

In various embodiments, the communicating includes sending, via the cluster head, the spectrum coordination information from the small cells of the cluster to the network entity.

In various embodiments, the cluster head is selected based on one or more criteria of an application for implementing by the cluster head.

In some embodiments, the one or more criteria includes at least one of backhaul bandwidth and backhaul bandwidth utilization for each of the small cells.

In various embodiments, a first set of small cells of the cluster is operated by a first operator entity and a second set of small cells of the cluster is operated by second operator entity different from the first operator entity.

In some embodiments, the spectrum coordination information allows the first set of small cells and the second set of small cells to coordinate usage of a spectrum belonging to the first operator entity and a spectrum belonging to the second operator entity.

A method for synchronizing a neighboring small cell includes, but is not limited to any one or combination of determining, at a first small cell, synchronization information of a second small cell; performing a comparison of the synchronization information of the second small cell with synchronization information of the first small cell; generating updated synchronization information based on the comparison; and sending the updated synchronization information to the second small cell for synchronizing the second small cell based on the updated synchronization information.

In various embodiments, the synchronizing the second small cell based on the updated synchronization information comprises adjusting a timing of the second small cell to match a timing of the first small cell.

In various embodiments, the synchronization information of the first small cell is based on synchronization information received, at the first small cell, from at least one of a macro cell, a precision timing protocol (PTP) server, and a navigation system.

In various embodiments, the determining includes receiving, at the first small cell, the synchronization information from the second small cell.

In various embodiments, the determining includes receiving, at the first small cell, at least one signal from the second small cell; and determining the synchronization information of the second small cell based on the at least one signal.

In various embodiments, the synchronization information of the first small cell meets predetermined criteria.

In various embodiments, the synchronization information of the second small cell, before synchronizing based on the updated synchronized information, does not meet predetermined criteria.

In various embodiments, second synchronization information of the second small cell resulting from synchronizing based on the updated synchronized information meets the predetermined criteria.

In various embodiments, the synchronization information includes information relating to one or more of timing and frequency.

In various embodiments, the method is performed only if the first small cell is not serving a user equipment.

In various embodiments, the method further including sending the updated synchronization information to a third small cell for synchronizing the third small cell based on the updated synchronization information. The second small cell and the third small cell belong to a same cluster.

A method for synchronizing small cells including a first small cell and a second small cell includes, but is not limited to any one or combination of providing, from the second small cell, first synchronization information of the second small cell to the first small cell; receiving, at the second small cell, updated synchronization information from the first small cell, the updated synchronization information is based on a comparison of the first synchronization information of the second small cell and synchronization information of the first small cell; and synchronizing the second small cell based on the updated synchronization information.

In various embodiments, the method further including providing the updated synchronization information to a third small cell for synchronizing the third small cell based on the updated synchronization information. The second small cell and the third small cell belong to a same cluster.

In various embodiments, the method further including providing, from the second small cell, synchronization information to a third small cell for synchronizing the third small cell based on the synchronization information after the second small cell is synchronized based on the updated information. The second small cell and the third small cell belong to a same cluster.

DETAILED DESCRIPTION

Various embodiments relate to forming a cluster of small cells (e.g., femtocells, picocells, etc.) and selecting a cluster head based on one or more criteria for performing tasks, such as communicating with a network entity, on behalf of the small cells in the cluster. In particular embodiments, the one or more criteria are based on backhaul bandwidth, backhaul bandwidth utilization of each of the small cells in the cluster, and/or other factors. For instance, one of the small cells that has sufficient backhaul bandwidth for an aggregate backhaul bandwidth utilization of the small cells of the cluster may be selected as the cluster head.

In some embodiments, the cluster head aggregates and filters some key performance indicators (KPIs) for the cluster (and/or the individual small cells of the cluster). Accordingly, the KPIs for the cluster may be sent to an Operations, Administration, and Maintenance (OAM) entity. In some embodiments, the cluster head (or other small cell) serves as a local mobility anchor for the small cells in the cluster, thus reducing the signaling to the network entity (e.g., core network or evolved packet core). In some embodiments, a source cell in the cluster can decide a target small cell for a UE handover based on UE measurement reports as well as information exchanged between the small cells in the cluster (e.g., about backhaul availability, load etc.,). In some embodiments, a tightly synchronized small cell (that may be the cluster head for synchronizing the cluster) may be configured to synchronize loosely synchronized small cells in the cluster. In some embodiments, the cluster head coordinates efficient spectrum utilization (e.g., using Authorized Shared Access (ASA) of the small cells of the cluster in the guard bands between operators of the small cells/clusters.

Figure 1:
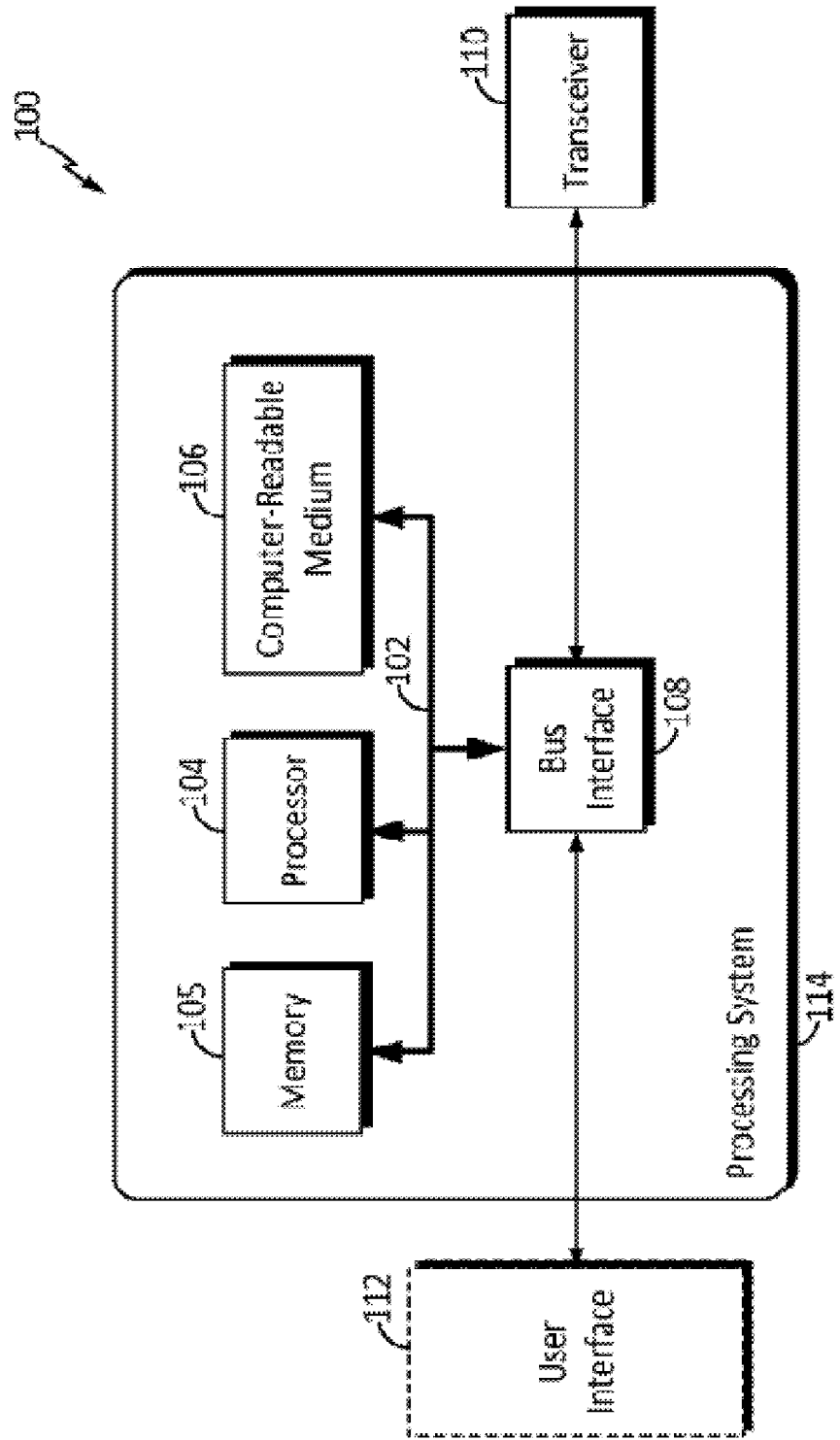
FIG. 1 is a block diagram illustrating an example of a hardware implementation for an apparatus or device employing a processing system according to various embodiments.

FIG. 1 is a schematic diagram illustrating an example of a hardware implementation for a communication apparatus 100, employing a processing system 114, which may be similar to hardware used in conjunction with transceiver devices, devices communication with transceiver device, etc. One or more of the devices described herein, including, transceiver devices, mobile devices, server, etc., may be implemented using hardware that includes a processing system, such as the processing system 114, that includes one or more processors 104. Examples of the processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In the example of FIG. 1, the processing system 114 may be implemented with a bus architecture, represented generally by a bus 102. The bus 102 may include any number of interconnecting buses and bridges depending on the specific application of the processing system 114 and the overall implementation constraints. The bus 102 links various modules/units/circuits of the processing system 114, including one or more processors (represented generally by the processor 104), a memory 105, and computer-readable media (represented generally by computer-readable medium 106). The bus 102 may also link various other modules/units/circuits such as clock (timing) resources, peripheral devices, voltage regulators, power management circuits, etc. A bus interface 108 provides an interface between the bus 102 and a transceiver 110. The transceiver 110 is configured to communicate with various other apparatus (e.g., other processing systems, such as the example processing system 114, which may be configured to perform various functionalities, such as performing a transceiver device's functionality, a mobile device's functionality, etc.) over a transmission medium. Depending upon the nature of the apparatus, a user interface 112 (e.g., keypad, display, speaker, microphone, joystick) may also be provided.

The one or more processors 104 in the processing system 114 may execute software. Software refers to instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, may be external to the processing system 114, or distributed across multiple entities including the processing system 114. The computer-readable medium 106 may be embodied in a computer program product. By way of example, a computer program product may include a computer-readable medium in packaging materials.

The disclosure provided herein may be implemented across a broad variety of telecommunication systems, network architectures, and communication standards. In any particular wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between a mobile user equipment (UE) and the core network (CN), and may include circuit switched and packet switched protocols. The AS provides the lower layers, for signaling between the access network and the UE, and may include a user plane and a control plane. Here, the user plane (data plane) carries user traffic, while the control plane carries control information (i.e., signaling).

Figure 2:
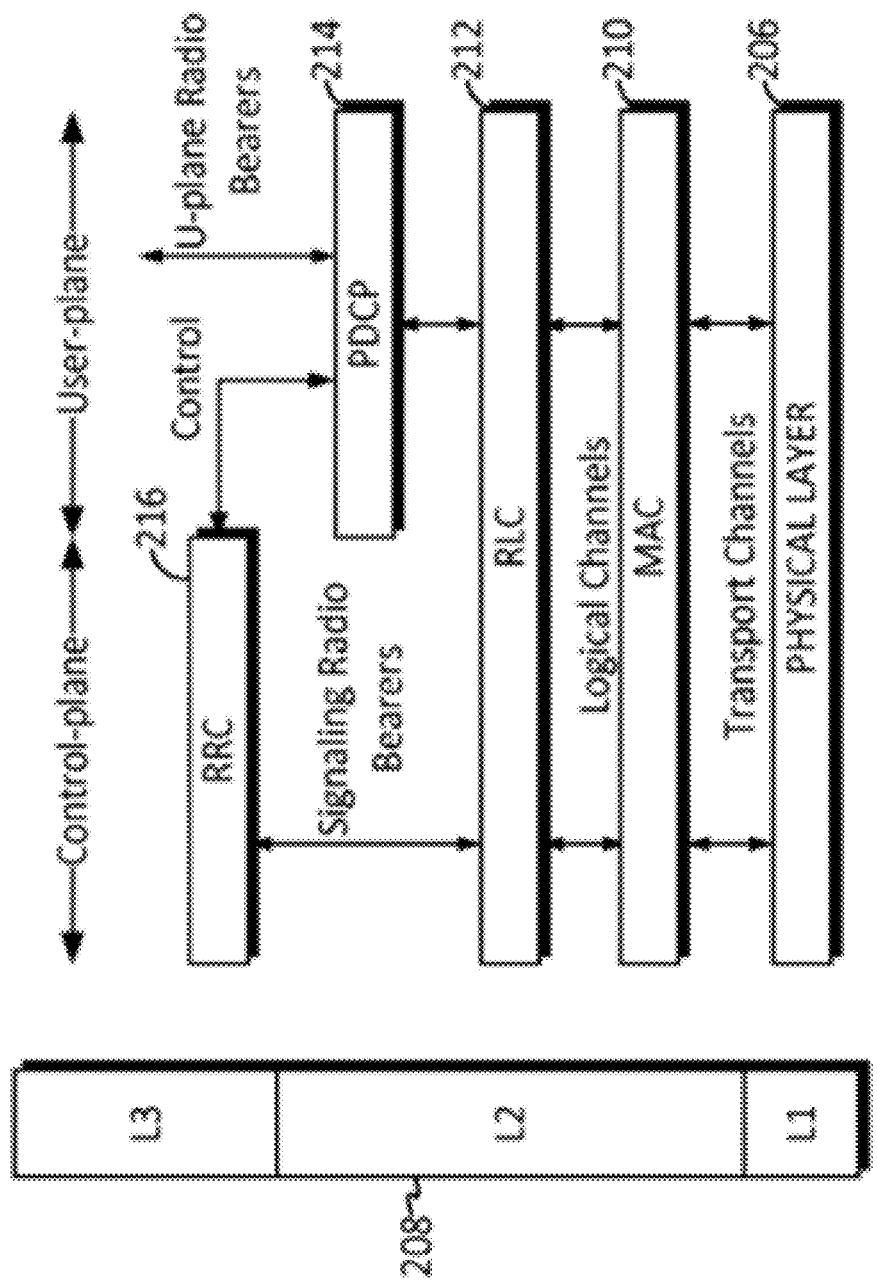
FIG. 2 is a diagram illustrating an example of a radio protocol architecture for user and control plane according to various embodiments.

With reference to FIG. 2, an example embodiment of an AS is shown with three layers: Layer 1, Layer 2, and Layer 3. Layer 1 (L1) is the lowest layer and implements various physical layer signal processing functions. Layer 1 will be referred to herein as the physical layer 206. The data link layer, also referred to as Layer 2 (L2) 208, is above the physical layer 206 and is responsible for the link between the UE 210 and a Node B over the physical layer 206.

At Layer 3 (L3), a radio resource controller (RRC) layer 216 handles the control plane signaling between the UE 210 and the Node B. RRC layer 216 includes a number of functional entities for routing higher layer messages, handling broadcasting and paging functions, establishing and configuring radio bearers, etc.

In the illustrated diagram, the L2 layer 208 is split into sub-layers. In the control plane, the L2 layer 208 includes two sub-layers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208, including a network layer (e.g., IP layer).

The PDCP sublayer 214 provides multiplexing functionality between different radio bearers and logical channels. The PDCP sublayer 214 also provides header compression for upper layer data packets to reduce radio transmission overhead, security by ciphering the data packets, and handover support for UEs between Node Bs.

The RLC sublayer 212 generally supports an acknowledged mode (AM) (where an acknowledgment and retransmission process may be used for error correction), an unacknowledged mode (UM), and a transparent mode (TM) for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations for High Speed Packet Access (HSPA).

Figure 3A:
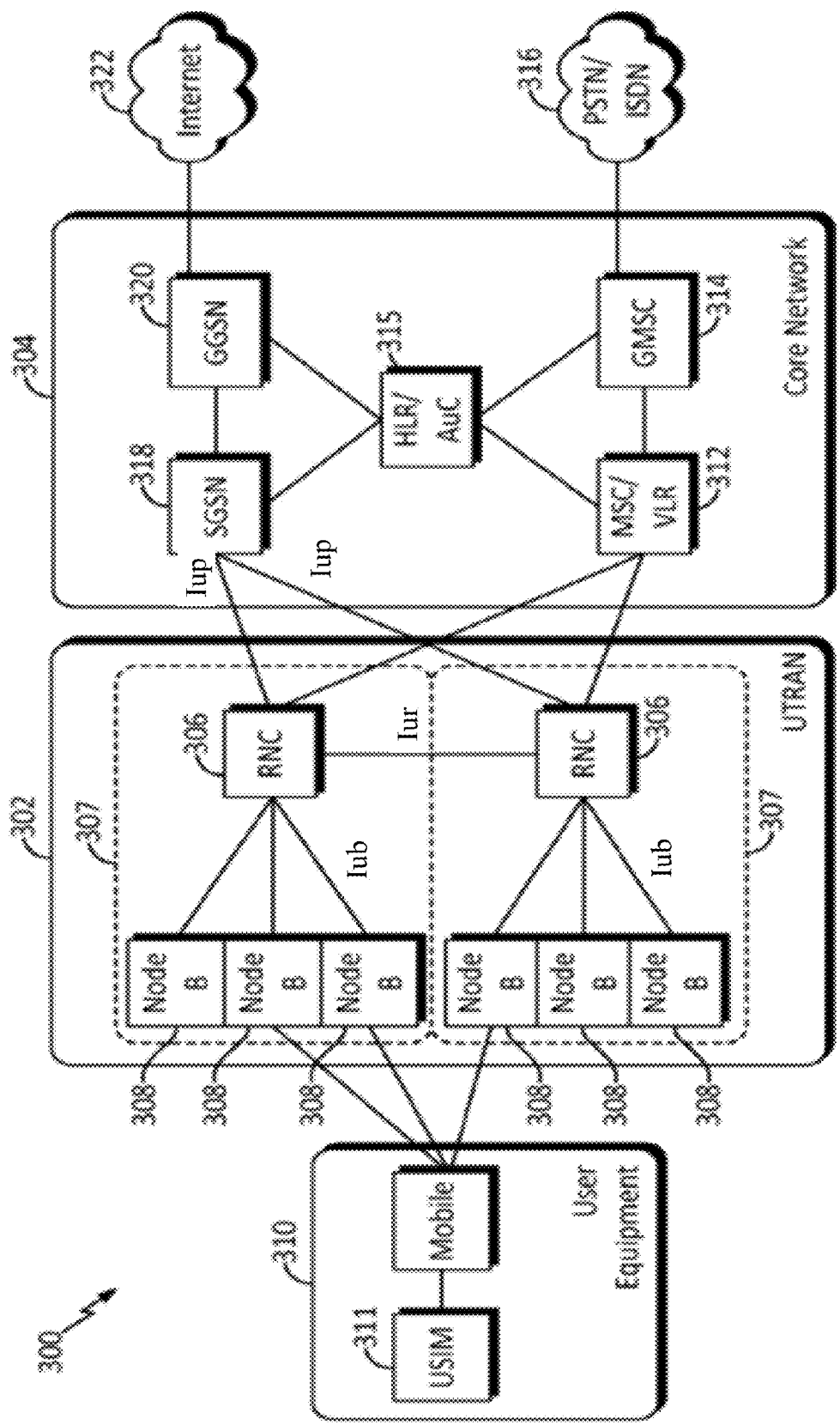
FIG. 3A is a diagram illustrating an example of a telecommunications system according to various embodiments.

Referring now to FIG. 3A, a schematic diagram of an example embodiment of a Universal Mobile Telecommunications System (UMTS) network 300 is shown. The UMTS network 300 includes three interacting domains: a core network 304, a radio access network (RAN) (e.g., the UMTS Terrestrial Radio Access Network (UTRAN)) 302, and a user equipment (UE) 310. Among several options available for a UTRAN 302, in this example, the illustrated UTRAN 302 may employ a W-CDMA air interface for enabling various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the illustrated RNCs 306 and RNSs 307. The RNC 306 is an apparatus responsible for, among other things, assigning, reconfiguring, and releasing radio resources within the RNS 307. The RNC 306 may be interconnected to other RNCs (not shown) in the UTRAN 302 through various types of interfaces such as a direct physical connection, a virtual network, or the like using any suitable transport network.

Figure 3B:
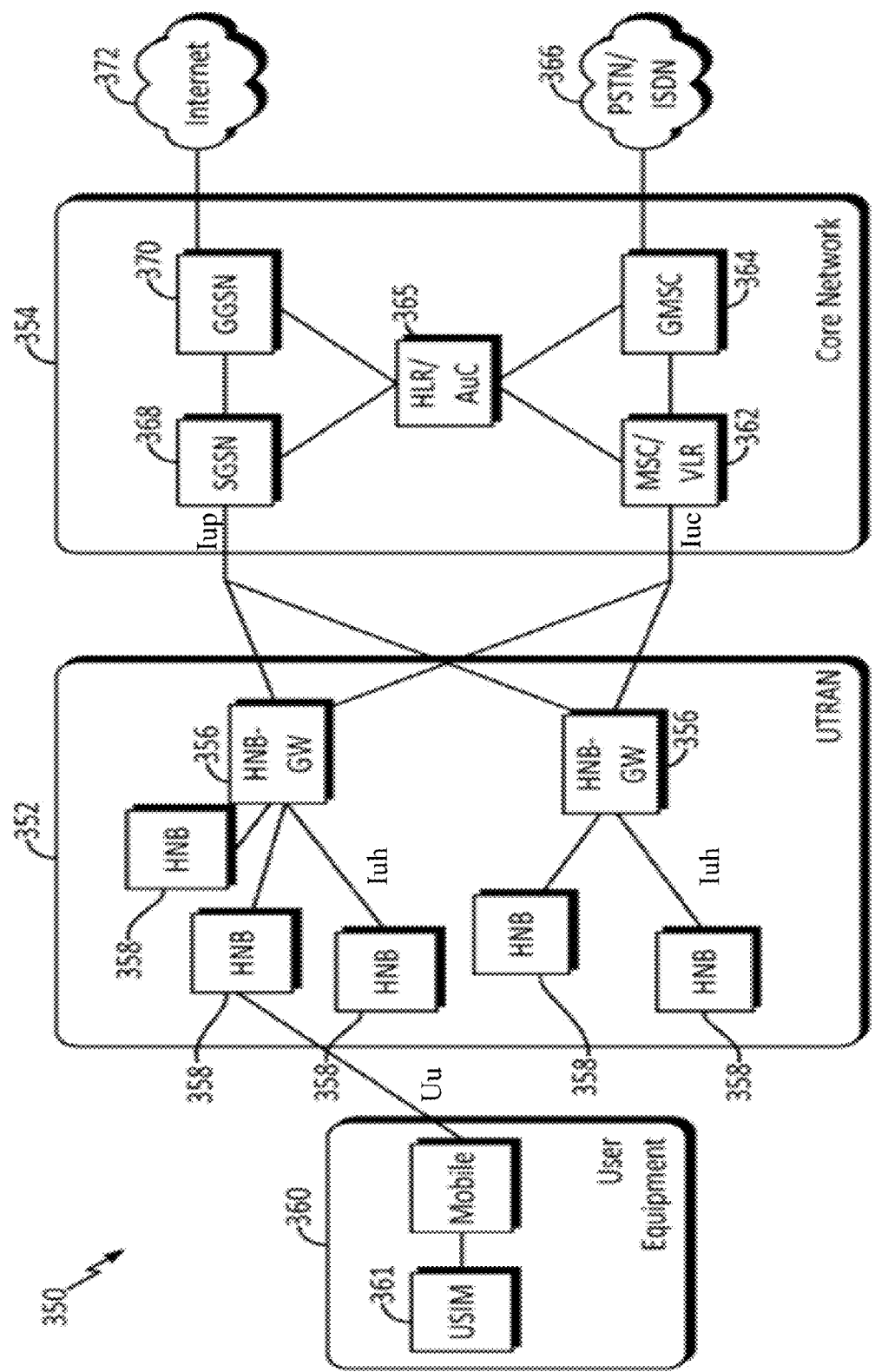
FIG. 3B is a diagram illustrating an example of a telecommunication system according to various embodiments.

The geographic region covered by the RNS 307 may be divided into a number of cells, with a radio transceiver apparatus serving each cell. A radio transceiver apparatus is commonly referred to as a Node B in UMTS applications, but may also be referred to as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. As will be described in greater details below, in some embodiments, the Nodes B may include small-area cells (e.g., 358 in FIG. 3B), which may also referred to as small cells, Home Node B (HNB), Home eNodeB (HeNB), etc., implemented, for example, using low-power transceivers such as femtocells, picocells, etc. The small cells may be configured to communicate with each other via backhaul or out-band-links to exchange information such as neighboring information. Based on the exchanged information, the small area cells (corresponding, for example, to the Node Bs 308 depicted in FIG. 3A) may automatically configure themselves for communication with one or more user equipment so as to enable enhanced cooperation between multiple (e.g., numerous) small cell networks operating in geographic proximity of each other and mitigating inter small cell interference.

The Node Bs 308 provide wireless access points to a core network (CN) 304 for any number of mobile apparatuses. Examples of a mobile apparatus include a cellular phone, a smart phone, a session initiation protocol (SIP) phone, a laptop, a notebook, netbook, a smartbook, a personal digital assistant (PDA), a tablet device, a satellite radio, a global positioning system (GPS) device, a multimedia device, a video device, a digital audio player (e.g., MP3 player), a camera, a game console, or any other similar functioning device. As noted, the mobile apparatus is commonly referred to as user equipment (UE), but may also be referred to as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308, but any number of UEs may communicate with the radio access network 302. The downlink (DL), also called the forward link, refers to the communication link from a Node B 308 to a UE 310 and the uplink (UL), also called the reverse link, refers to the communication link from a UE 310 to a Node B 308.

In some embodiments, the core network 304 can interface with one or more access networks, such as the UTRAN 302. As shown, the core network 304 is a UMTS core network. However, the systems and methods presented throughout this disclosure may be implemented in a RAN, or other suitable access network, to provide UEs with access to types of core networks other than UMTS networks.

The illustrated UMTS core network 304 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In some embodiments, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UEs to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UEs location and forwards the call to the particular MSC serving that location.

In some implementations, the illustrated core network 304 may be configured to support packet-switched data services with a serving GPRS support node (SGSN) 318 and a gateway GPRS support node (GGSN) 320. General Packet Radio Service (GPRS) is generally implemented to provide packet-data services at speeds higher than those available with standard circuit-switched data services. The GGSN 320 provides a connection for the UTRAN 302 to a packet-based network 322. The packet-based network 322 may include the Internet, a private data network, or some other suitable packet-based network. One function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

In some implementations, the UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 302 is based on such DS-CDMA technology and additionally calls for a frequency division duplexing (FDD). FDD uses a different carrier frequency for the uplink (UL) and downlink (DL) between a Node B 308 and a UE 310. Another air interface for UMTS that utilizes DS-CDMA, and uses time division duplexing (TDD), is the TD-SCDMA air interface.

As noted, in some embodiments, the cells communicating with mobile devices may include Home Node Bs (HNBs), such as femtocells, picocells, or other types of small cells. Thus, with reference to FIG. 3B, a schematic diagram of an example embodiment of a communication network 350 that includes one or more HNBs 358 is shown. The network 350 includes a core network (CN) 354 which may be similar to the core network 304 of FIG. 3A, and one or more user equipment (UE) 360, which may be similar to the UE 310 depicted and described in relation to FIG. 3A. As shown, in some implementations, the HNBs 358 communicate with the core network 354 via one or more HNB gateways 356, referred to as HNB-GW, which direct HNB data traffic to and from the core network 354 via, for example, standard Iu-CS and Iu-PS interfaces.

In some embodiments, the cells communicating with mobile devices may include Home eNodeBs (HeNBs), such as femtocells, picocells, or other types of small cells. The HeNBs may be part of an E-UTRAN. Thus, with reference to FIG. 3C, a schematic diagram of an example embodiment of a communication network 375 that includes one or more HeNBs 388 is shown. The network 375 includes a core network or evolved packet core (EPC) 384, an EUTRAN 382, and one or more user equipment (UE) 380, which may be similar to the UE 310, 360 depicted and described in relation to FIGS. 3A-3B. The EPC 384 includes a mobility management entity (MME) 392 and a serving gateway (S-GW) 394. As shown, in some implementations, the HeNBs 388 communicate with the EPC 384 via one or more HeNB gateways 386, referred to as HeNB-GW, which direct HeNB data traffic to and from the EPC 384 via, for example, S1 interfaces. The HeNB-GWs 386 may communicate with each other via an X2 interface. In other embodiments, the HeNB-GWs 386 may be omitted, in which case one or more of the HeNBs 388 may be directly communicate with the EPC 384 (e.g., FIG. 3D).

In various embodiments, the cells communication with mobile devices may include eNodeBs (eNBs), for example that are part of the EUTRAN 382, which may be coupled be with the core network (e.g., EPC 384). The EUTRAN 382 may or may not include a gateway (eNB-GW).

Figure 4:
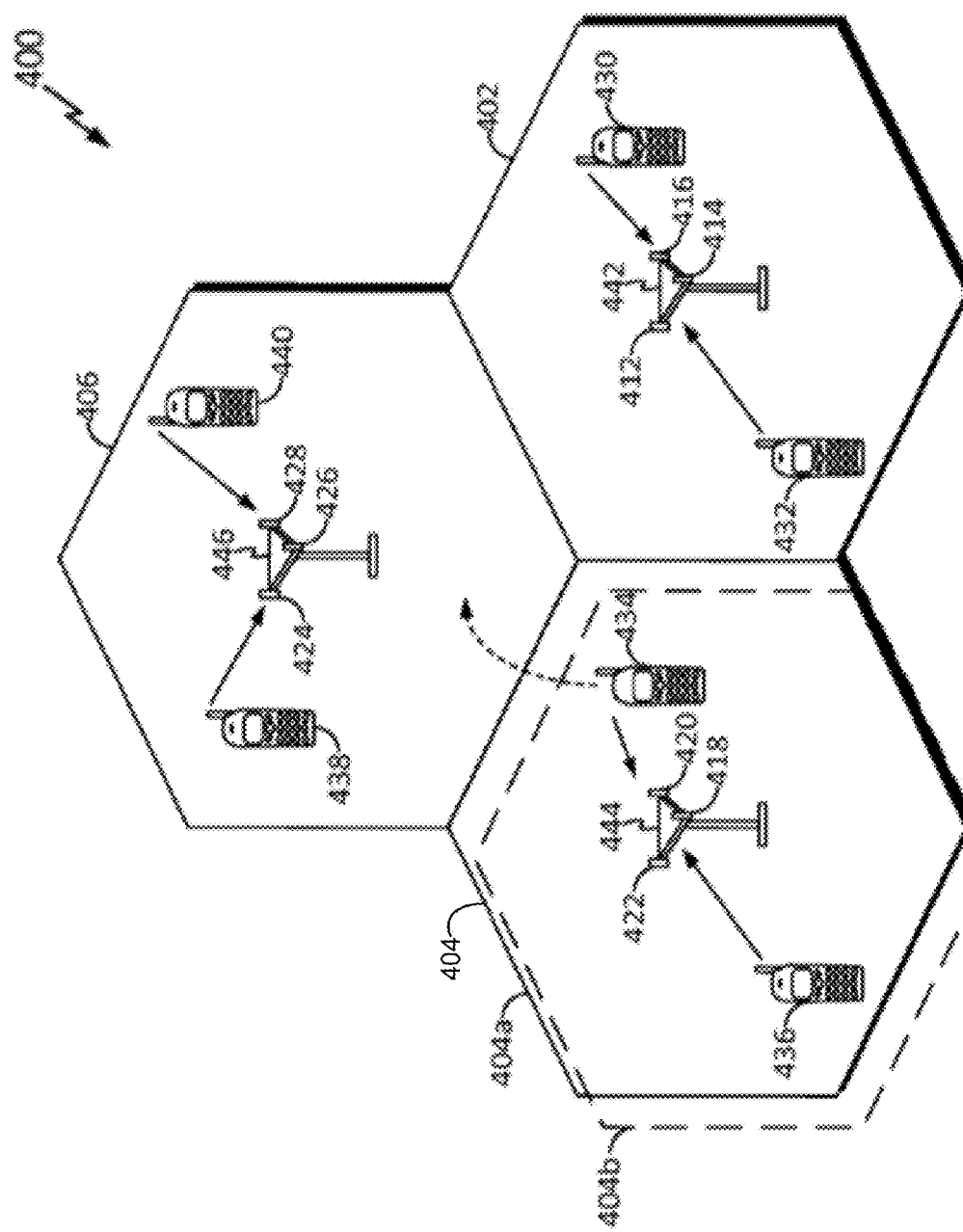
FIG. 4 is a diagram illustrating an example of a communication network according to various embodiments.

Referring now to FIG. 4, a simplified schematic illustration of a RAN 400 (which may be similar to the RAN 302 depicted in FIG. 3A) in a UTRAN architecture is illustrated. The system includes multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically defined cells 402, 404 and 406 may each be further divided into a plurality of cells, e.g., by utilizing different scrambling codes. For example, cell 404, which is served by a Node B (access point) 444 may utilize a first scrambling code, and cell 402, which is served by a Node B 442, may avoid interfering with implementation/operation of the cell 404 by utilizing a second scrambling code.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

As noted, the cells 402, 404, and 406 may communicate with one or more UEs. For example, UEs 430 and 432 may be in communication with Node B 442 (which, as noted, may be a small cell that was configured in accordance with the methods and procedures described herein), UEs 434 and 436 may be in communication with Node B 444, and UEs 438 and 440 may be in communication with Node B 446. Here, each Node B 442, 444, and 446 may be configured to provide an access point to a core network, such as the core network 304 of FIG. 3A, for all the UEs 430, 432, 434, 436, 438, and 440 in the respective cells 402, 404, and 406.

During a call with a source cell, or at any other time, a UE (e.g., 436), for example, may monitor various parameters of the source cell as well as various parameters of neighboring cells. Further, depending on the quality of these parameters, the UE 436 may maintain communication with one or more of the neighboring cells. During this time, the UE 436 may maintain an Active Set, which is a list of cells to which the UE 436 is, or can be, connected (e.g., the UTRAN cells that are currently assigning a downlink dedicated physical channel DPCH, or fractional downlink dedicated physical channel F-DPCH, to the UE 436 may constitute the Active Set).

Figure 5:
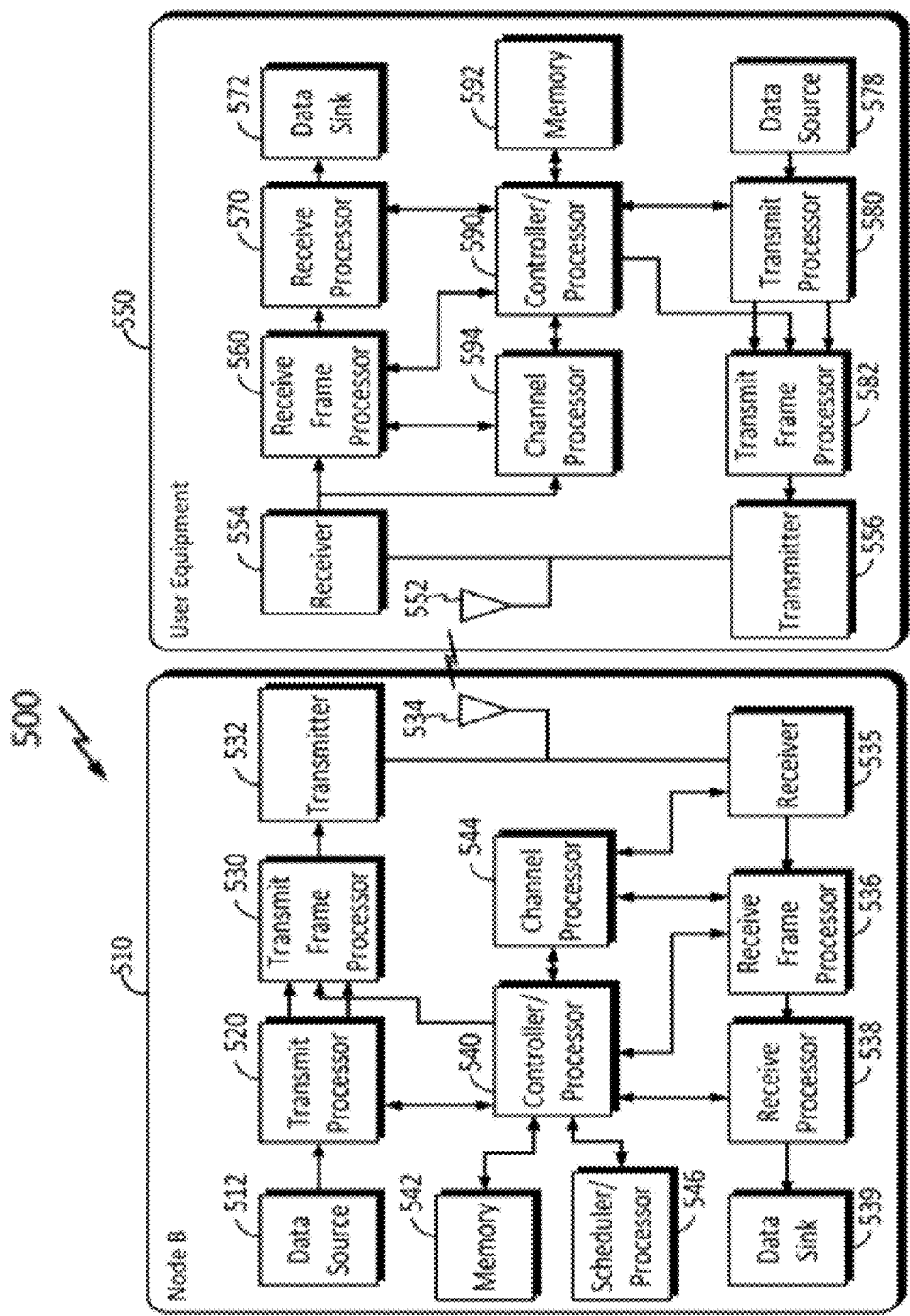
FIG. 5 is a block diagram illustrating an example of a small cell in communication with a user equipment (UE) in a telecommunications system according to various embodiments.

With reference now to FIG. 5, a block diagram of an example system including a Node B 510 in communication with an example UE 550 is shown. The Node B 510 may be similar to any of the Node Bs 308 shown in FIG. 3A (or any other access point discussed in the disclosure), and the UE 550 may be similar to the UE 310 shown in FIG. 3A (or any other UE discussed in the disclosure). The Node B 510 may include a small cell (e.g., a femtocell) with functionality similar to that discussed in greater detail below. In a downlink communication from the Node B 510 to the UE 550, a transmit processor 520 may receive data from a data source 512 and control signals from a controller/processor 540. The transmit processor 520 is configured to perform various signal processing functions for/on the data and control signals, as well as for/on reference signals (e.g., pilot signals). For example, the transmit processor 520 may be configured to provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

The UE 550 includes a receiver 554 to receive downlink transmissions through an antenna 552 and to process the transmissions to recover the information modulated onto carriers. The information recovered by the receiver 554 is provided to a receive frame processor 560, which is configured to, among other functions, parse each frame, and provide information from the frames to a channel processor 594, and provides the data, control, and reference signals to a receive processor 570. The receive processor 570 is configured to perform the inverse of the processing performed by the transmit processor 520 in the Node B 510. More specifically, the receive processor 570 can descramble and de-spread the symbols, and determine the most likely signal constellation points transmitted by the Node B 510 based on the modulation scheme. These soft decisions may be based on channel estimates computed by the channel processor 594. The soft decisions are then decoded and de-interleaved to recover the data, control, and reference signals. CRC codes may be checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In uplink communication, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which can parse each frame, and provide information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor 538, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

In a heterogeneous wireless network, multiple kinds of access points may provide wireless service to a UE, including, for example, high-power nodes (frequently referred to as macrocells) and low-power nodes. The low-power node can be any one of several examples of low-power nodes. Low-power nodes are also called small cells or small-area access points because of their generally smaller coverage provided compared to macro cells. For example, a femtocell, sometimes called a home Node B (HNB), home eNodeB (HeNB), a Femtocell Access Point (FAP), or any other suitable name, is a small base station or Node B typically configured for use in a home or office, or some other relatively small geographical area. Other examples may include picocells, metrocells, etc. The small cell may typically utilize a high-speed Internet connection, such as a cable or DSL connection for its backhaul connection to the core network. A picocell (or micro-cell) is a relatively small and low-cost base station typically deployed to extend coverage from that available from a macro cell deployment, e.g., into buildings, malls, train stations, etc., where coverage from macro cells may otherwise be lacking. Low-power nodes have recently been deployed in rapidly increasing numbers with an aim to achieve cell-splitting gain. That is, because there is a limited amount of spectrum available for deploying additional carrier frequencies within the same region, cell splitting can help to increase a network's capacity.

In some implementations, clusters or groups of small cells (nodes) may be configured with small-area-cell-to-small-area-cell communication capabilities, and various other adaptations to provide for joint configuration of small-area-cell parameters to control their wireless communication performance with UEs, and for enhanced mobility of UEs within the cluster. Generally, small cells communicating with each other do not form explicit networks (except to provide for seamless mobility within small cells). As noted, in some embodiments, small cells are configured to detect one or more neighboring small cells, and exchange information (including some parameters) to enable a joint small cell configuration. Each small cell may then serve the UEs associated to it. Subsequent to the exchange of information between small cells to facilitate joint small cell configuration, additional communication between small cells may occur when some parameters change for one or more of the small cells and the joint configuration enabled through the cell-to-cell communication requires updating.

The term "small-area-cell-to-small-area-cell communication" encompasses communication in any group of low-power nodes in a wireless communication network, e.g., picocells, femtocells, etc., or between different categories of small cells (e.g., pico-femto, etc.), or, in some examples, may apply to macro cells as well. In some embodiments, cooperation between neighboring small cells/nodes, such as femtocells, may be utilized to obtain an enhanced topology map of the neighboring small cells of interest, to facilitate enhanced transmit power calibration of small cells, avoid choosing the same primary scrambling code (PSC) between neighboring small cells (and thus avoid PSC collision), enable enhanced small cell selection by the UEs and enable adaptive network/cluster formation with the neighboring small cells to provide for contiguous RF coverage and seamless mobility for UEs within the coverage area of the cluster.

Figure 6:
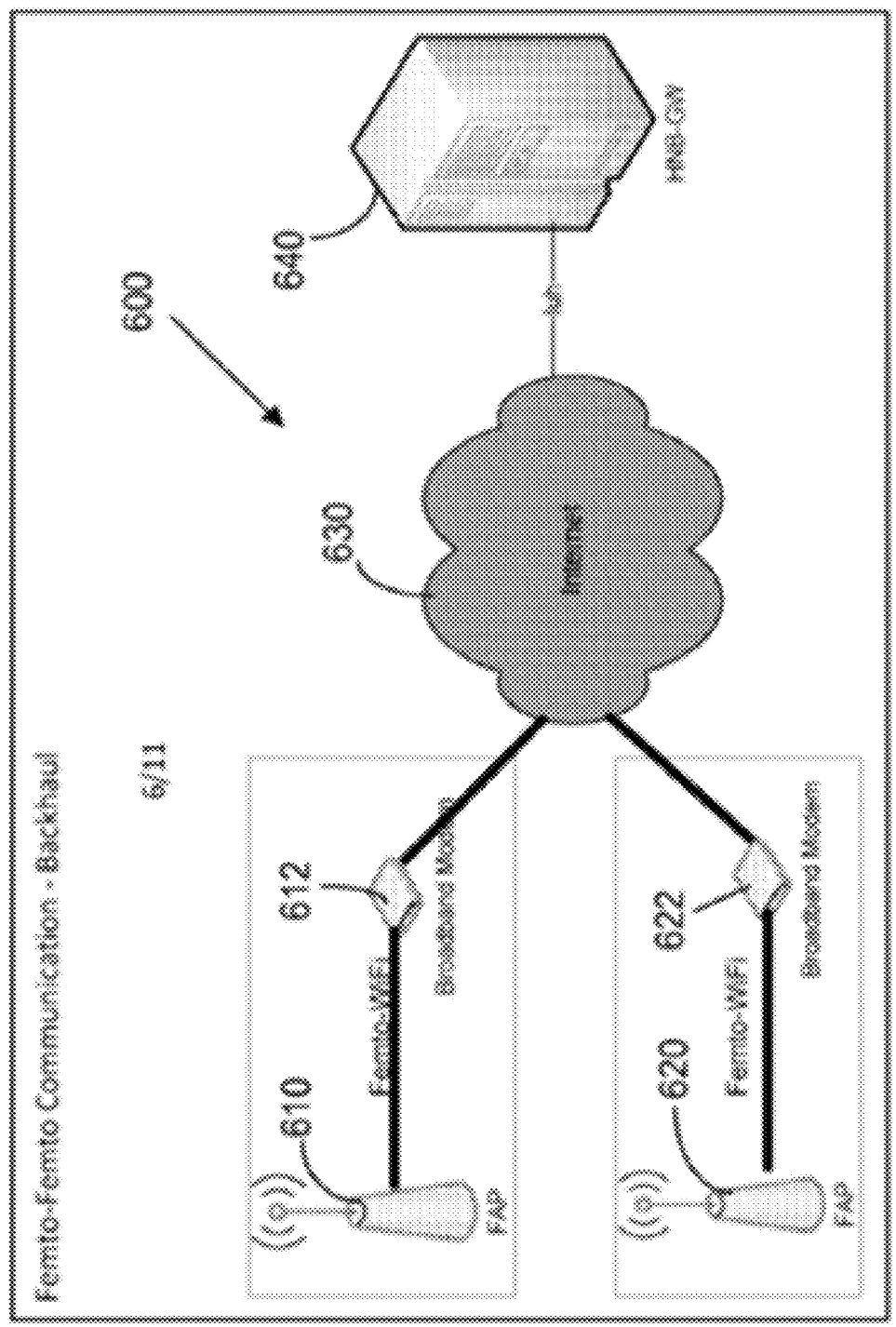
FIGS. 6-8 are diagrams illustrating small-area-cell-to-small-area-cell communication links according to various embodiments.
Figure 7:
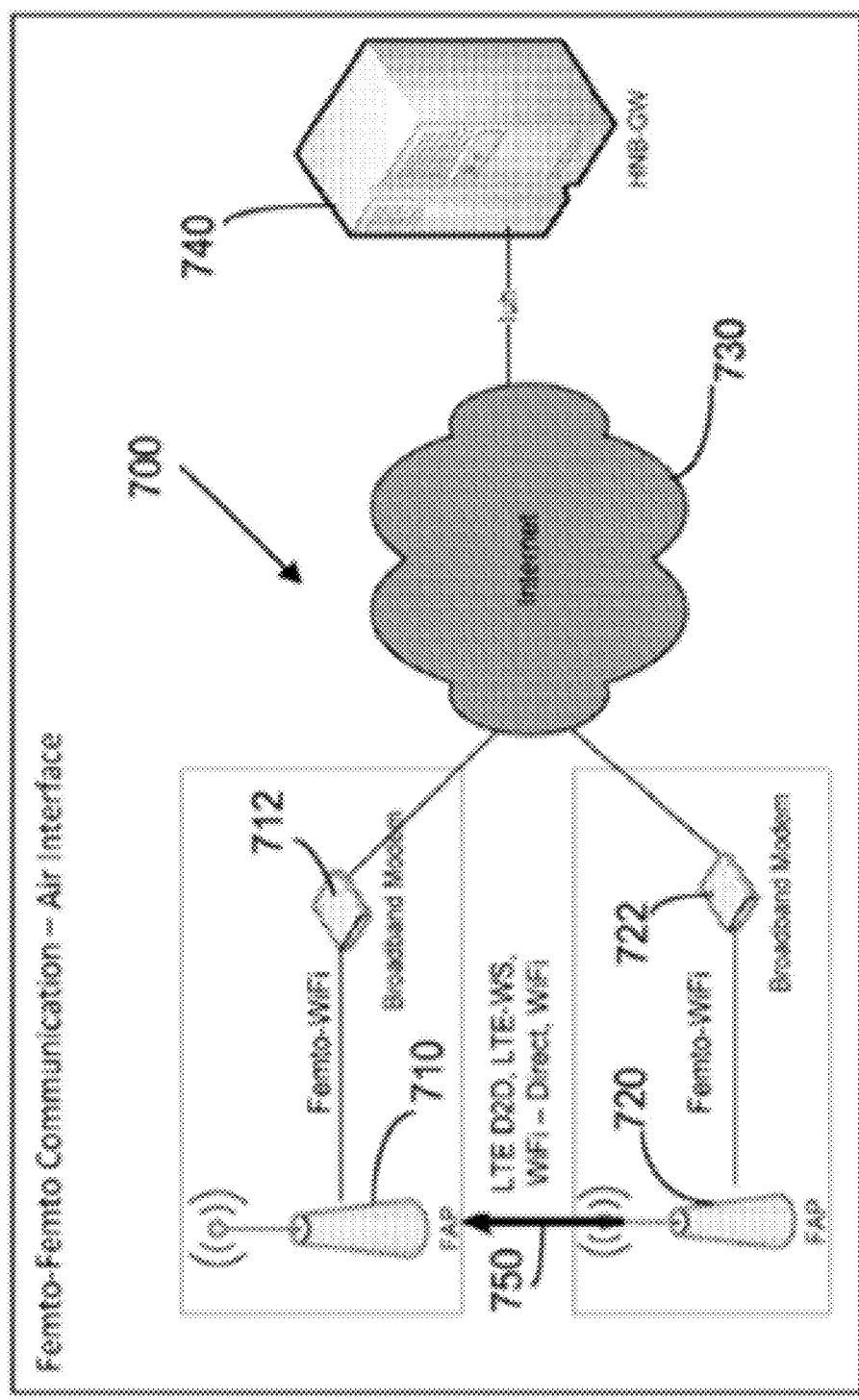
Figure 8:
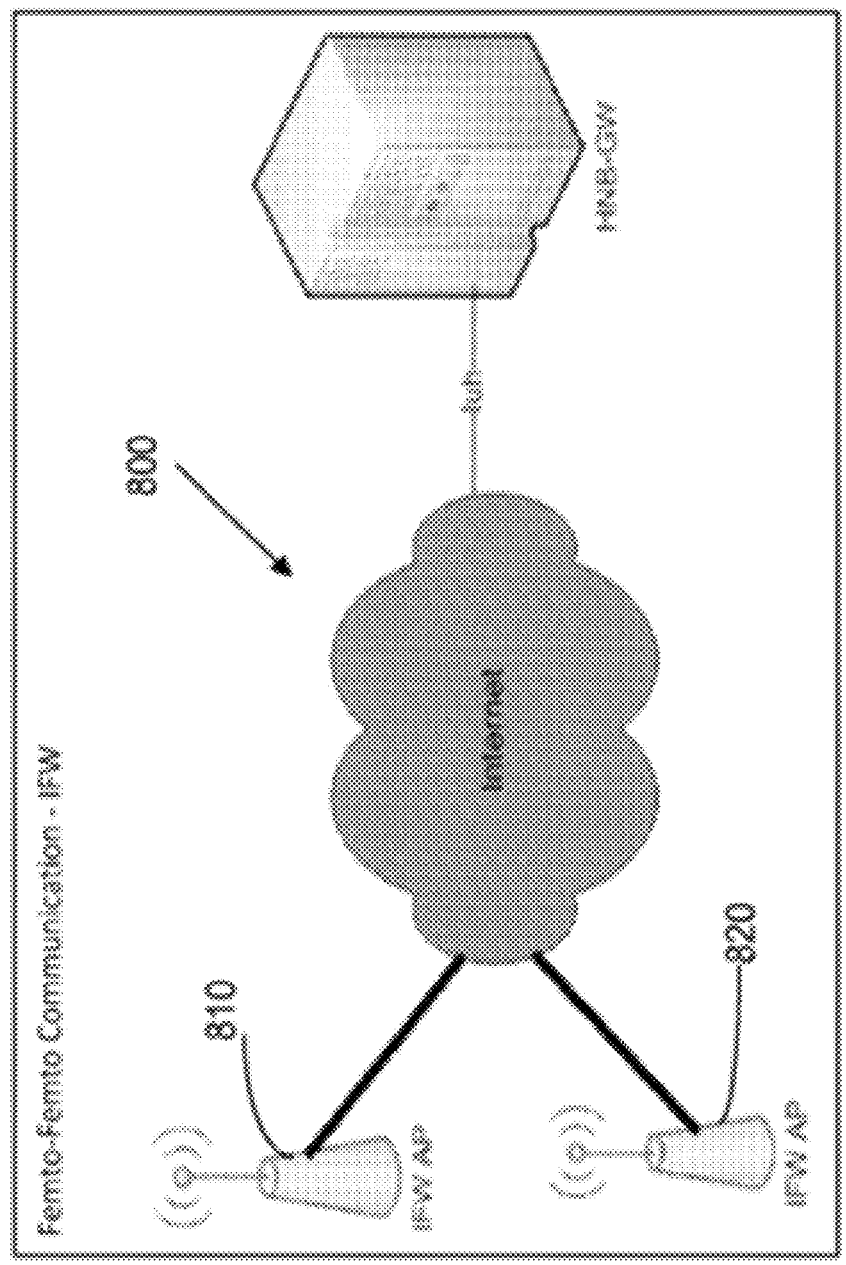

Thus, with reference to FIG. 6-8, different small cell network configurations, that include a first small cell (e.g., a small cell 610 in FIG. 6) and at least one neighbor small cell (e.g., a small cell 620 in FIG. 6) are shown. In the shown example embodiments of the networks of FIGS. 6-8, a first small cell (e.g., the cell 610) is adapted to identify at least one neighbor small cell (e.g., the cell 620) to exchange information (e.g., cell information) with at least one neighbor information (e.g., neighbor information to identify the two cells' respective neighbors) via a communication link established between the two cells, and to be automatically configured based, at least in part, on the information exchanged between the first and the at least one neighbor small cells. Although the example embodiments of FIGS. 6-8 show only two small cells, small-are-cell networks may have any number of small cells, with at least one of those cells being adapted to perform automatic configuration (e.g., of the cells' wireless communication functionality) based on information exchanged with identified neighboring cells.

More particularly, FIG. 6 is a diagram of a network 600 in which a backhaul-based communication link is established between the first small cell 610 and its neighbor small cell 620. Such a backhaul link may be established via a communication network to which the first cell and its neighbor cell are connected. As shown in FIG. 6, in some embodiments, the small cells 610 and 620 (which may include, for example, femto access points (FAP)) are each coupled to respective broadband modems 612 and 622 utilizing wired connection, e.g., Ethernet, thus forming, for example, a Femto-WiFi system. In some embodiments, the small cells 610 and 620 and the respective WiFi access point may be integrated. The small cells 610 and 620 may each be associated with, for example, an identification value, such as a femto ID, a WiFi ID, an IP address corresponding to the backhaul connection, a primary scrambling code (PSC) for a Wireless Wide Area Network (WWAN) air interface, etc. The broadband modems 612 and 622, which may include one or more of, for example, a cable modem, a DSL modem, or any suitable modem, may be suitably coupled to a network 630 such as the Internet (or any other type of network, including packet-based network, non-packet-based network, etc.), to thus enable establishment of a communication link to a Home Node B Gateway (HNB-GW) 640. The HNB-GW is a conventional network entity that generally behaves like a radio network controller RNC in a UMTS network.

As noted, in some embodiments, at least some of the small cells in a particular geographic area may be configured to communicate with neighbor small-area access cells. For example, a small cell (e.g., the cells 610 and/or 620) may include a network listen module (NLM) to identify neighbor cells/nodes and to determine information about the neighbor small cells/nodes. In some implementations, the NLM may be configured to sniff/listen to the system information messages broadcast by a neighboring cell on the same or different frequency/channel on which the small cell is operating in order to, for example, identify it and gather aiding information related to that neighboring small cell like PSC. Thus, the NLM in the small cell acts like a virtual UE1. Here, the first small cell 610, for example, may scan its proximity to obtain information about neighboring cells (e.g., femtocells, macrocells, etc.). The small cell's NLM, for example, can enable collection of such information as the PSCs of neighboring cells within range. Furthermore, in some implementations, the small cell(s) may include an out-of-band (OOB) interface to enable the cell to obtain OOB identifiers of neighbor cells that are configured to communicate through that type of an OOB interface. With information obtained by the first small cell, the cell may contact a server, such as a RADIUS server (e.g., hosted at the HNB-GW) and obtain the IP address of the neighboring cells. This information, once obtained, may be stored at the small cell so that such information gathering functionality does not need to be repeated.

Once the IP address of neighboring small cells are known, a link may be set up between the first cell (e.g., the cell 610) and at least one of its neighboring cells (e.g., the cell 620). A suitable transport layer protocol, e.g., Stream Control Transmission Protocol (SCTP) over IP, may be utilized for establishing this link. Such a link may be similar to an X2 interface standardized in an E-UTRAN (LTE) network. In some embodiments, the protocol for communicating between the cells (nodes) may be similar to the Inter Access Point Protocol (IAPP) utilized for 802.11 networks. Thus, in some embodiments, a first small cell is configured to identify (e.g., through a NLM unit) at least one neighbor small cell, and to exchange information (e.g., cell information, including neighbor information etc.) via a backhaul link (e.g., an IP-based communication link) established through a network to which the two small cells are connected (e.g., via a modem such as the broadband modems 612 and 622).

FIG. 7 is a schematic diagram illustrating communication in a network 700 between a first small cell 710 and a neighbor small cell 720 implemented via an in-band or out-of-band (OOB) link established between the two small cells. For example, in implementations in which the small cells can communicate via in-band links, e.g., E-UTRAN (LTE)-based communication, the small cells may be configured to implement LTE Device-to-Device (D2D) (also known as LTE Direct) or LTE over white space (LTE-WS) protocols to communicate with one another. Of course, any other suitable WWAN air interface protocol may be utilized for the in-band link between the low-power nodes. For out-of-band communication, WiFi, WiFi Direct, Bluetooth, etc. could be used between the small cells if so equipped.

As noted, in some embodiments, the wireless air interface may be an OOB link, such as a WiFi link. In one example, a virtual STA attached to IFW-AP may connect to a neighbor IFW AP and obtain (e.g., retrieve) relevant information over the WiFi link. Additionally, and/or alternatively, a WiFi Direct protocol may be utilized between IFW APs. Here, white space, (e.g., WiFi or WiFi Direct over white space), may be utilized for the link between the small cells, while the ISM band may be utilized for other communication. In some embodiments, Power Line Communication (PLC) or any other suitable protocol may be utilized for cell-to-cell communication (e.g., communication between one access point/node to another access point/node).

In some embodiments, a "virtual UE" may be integrated into a small cell (such as a femtocell), and the "virtual UE" may be configured to connect to a neighbor small cell and establish bi-directional communication over the air interface. In such embodiments, the virtual UE can be enabled to transmit to neighboring small cells in the same or in a similar fashion as a conventional UE. In other words, the small cell may be configured to communicate with a neighboring access point (small cell) in a manner similar to the way a UE would communicate with an access point of the network with which it is in communication. A virtual UE may enable uplink transmission as well as downlink reception capabilities. With a virtual UE, neighboring low-power nodes can communicate with one another over their respective WWAN interface or over an OOB interface (such as WiFi.)

Thus, as shown in FIG. 7, the first small cell 710 may be configured to identify (e.g., using an NLM) the at least one neighbor small cell 720. Similar to the configurations depicted in FIG. 6, in some embodiments, the small cells 710 and 720 may be coupled to a network (e.g., the Internet or some other public or private network) via modems, such as the broadband modems 712 and 722, respectively (which may be similar to the modems 612 and 622 of FIG. 6). In some embodiments, the small cells are configured to establish a communication link 750 between them via the cells' air interface, and to exchange information (e.g., cell information, including neighbor information). Based on the information exchanged via the air-interface link, which, as noted, may be an LTE 2D2 link, an LTE-WS link, a WiFi-direct, or some other out-of-band air link (e.g., based on communication protocol and/or bands other than those used for UE-to-cell communication), at least one of the first small area cell 710 and the neighbor small cell 720 may be automatically configured to implement an optimal (or near optimal) small cell network for communication with UEs.

With reference to FIG. 8, a network 800 that includes small cells 810 and 820, which may be Integrated Femto WiFi (IFW) access points, is shown. In some embodiments, the small cells 810 and 820 may implement, for example, IEEE 802.11f or Inter-Access Point Protocol (IAPP) to enable the cells to communicate with one another. Other suitable wired or wireless distribution systems may also be utilized in some embodiments (e.g., proprietary protocols not based on IAPP). In particular embodiments, neighbor detection can be over NLM or OOB link. Once a neighboring cell is detected, the detecting small cell may obtain the neighboring cell's IP address from, for example, RADIUS server, and establish a communication link with the neighboring cell using IAPP.

Information exchanged between cells through cell-to-cell communication links (e.g., femto-AP-to-femto-AP communication) can accordingly facilitate implementing an enhanced neighbor topology for small cells in a heterogeneous network.

Thus, using various types of cell-to-cell communication links between a cell and at least one of its neighbor cells, as described herein in relation to FIGS. 6-8, information is exchanged via those links, and based on that exchanged information, enhanced neighbor topology may be determined/derived. For example, a small cell may advertise/communicate an initial neighbor list that includes its immediate neighbor cells (i.e., small-area neighbor cells as well as other neighboring devices such as high-power nodes) that it can detect based on, for example, its network listen module. This initial list corresponds to first order neighbors of the small cell. In some implementations, if an OOB link is enabled, a small cell may augment its neighbor list with neighbor small cells that it can detect by utilizing, for example, its OOB interface. These neighbors may also be characterized as first order neighbors. In some embodiments, only the neighbor list containing first order neighbors are exchanged between small cells.

In some embodiments, a cell's neighbor list may be refined with assistance from neighboring small cells, e.g., by establishing small-area-cell-to-small-area-cell communication links and with its neighbors and exchanging information, including neighboring information, with those neighboring cells. That is, identity of the neighbors of its neighbors may be obtained by a small cell, with those identified neighbors of neighbors categorized as second order neighbors. In some embodiments, the neighbor cells may be ranked, e.g., according to their proximity to the first small cell, their location, etc. In this fashion, an improved neighbor topology can be established for a small cell.

Figure 9:
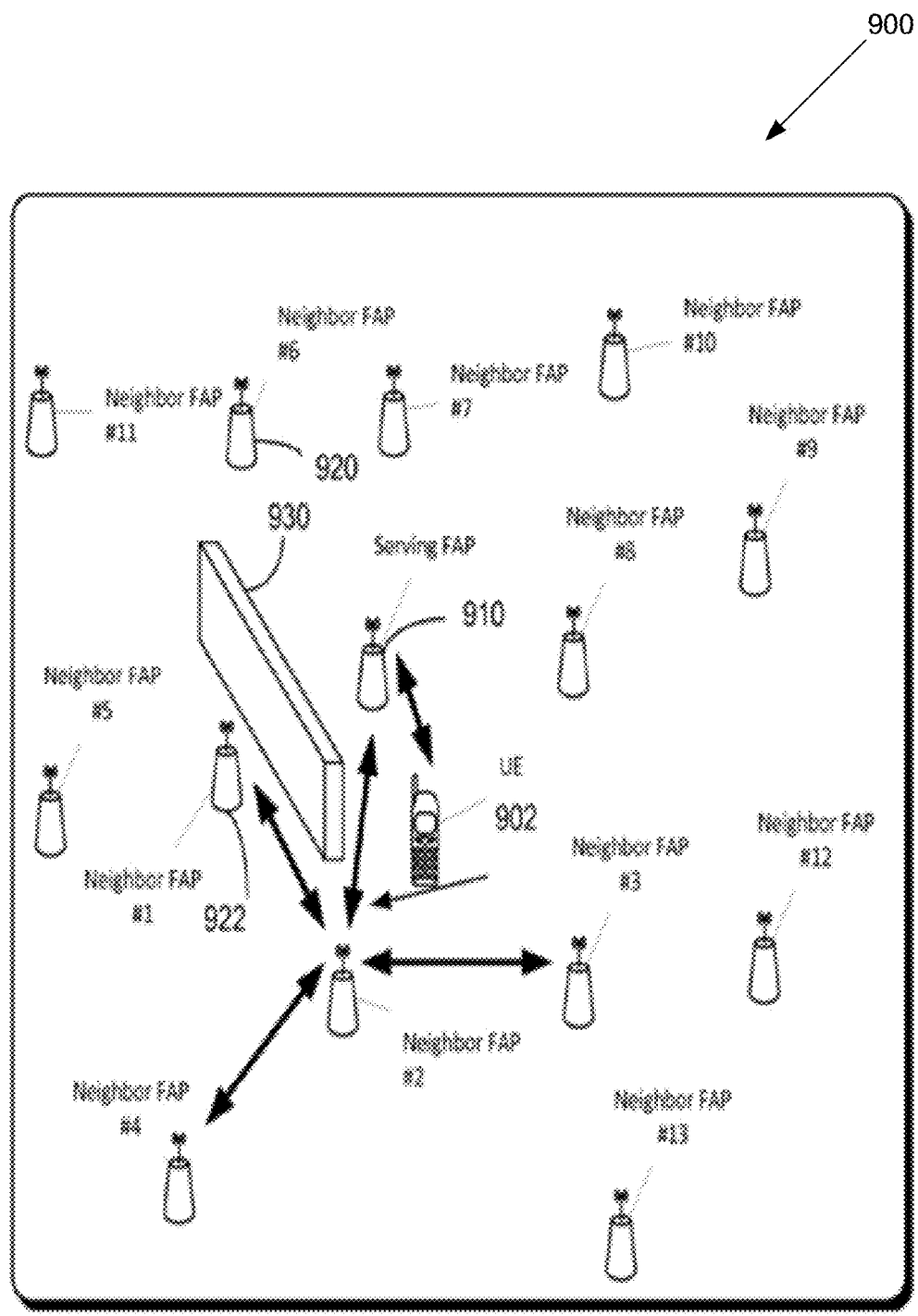
FIG. 9 is a diagram illustrating a cluster of low-power nodes according to various embodiments.

Thus, with reference to FIG. 9, a schematic diagram of an example embodiment of a cluster 900 of small cells, which may have been configured/constructed based on information exchanged between various small cells using cell-to-cell communications links (out-of-band or backhaul) is shown. As illustrated, the cluster 900 includes multiple small cells, which in the example of FIG. 9 may be femto access points (although different types of low-power small cells may be used in conjunctions with, or instead of, any of the nodes illustrated in FIG. 9). In the illustration of FIG. 9, a UE 902 is in communication with a serving FAP 910. Here, the serving node may have a neighbor list including neighbors obtained through the cell's network listen module (NLM), specifically {FAP #7, FAP #8, FAP #2, FAP #3}.

This neighbor list at the serving node 910 may be refined to include neighbors obtained by way of an out-of-band detection unit (implemented through the cell's out-of-band interface). In this example, FAP #6 (marked as cell 920) may be added to the neighbor list by being detected by the cell's OOB radio, but not being detected by the NLM. Thus, in implementations in which a cell's neighbor list may be identified based on neighboring cells identified by both an NLM and an out-of-band links, the neighbor list may be as follows: {FAP #6, FAP #7, FAP #8, FAP #2, FAP #3}.

As noted, in some embodiments, various cells in a particular geographical area may exchange information using cell-to-cell communication links (e.g., backhaul links, out-of-band links, etc.). Such exchange on information may precede any small-cell network formation (e.g., before a UE starts data transmission using a formed small-cell network), and the information so exchanged between the various cell may be used to construct/form the small cell network. In some embodiments, exchange of information may be sent subsequent to an initial formation of a small-cell network so as to update/adjust the network's existing configuration. Thus, in some implementations, the node 910 (e.g., before or after it has established communication with the UE 902 to become the serving node of the UE 902) sends its initial neighbor list, that includes first order neighbors detected by, for example, NLM or OOB mechanisms, to each of its neighbors using one or more small-area-cell-to-small-area-cell communication links. The cell 910 may also receive from each of its neighbors their first order neighbors. The cell 910 may therefore have information about small cells (in some examples, excluding the macro cells) not detected by its NLM or OOB, which are characterized as second order neighbors. In the example of FIG. 9, second order neighbors identified in the neighbor list of the serving node 910 may be as follows: {FAP #1, FAP #11, FAP #10, FAP #9, FAP #2, FAP #3}.

In some examples, more than one first order neighbor small cell may report FAP #1 (marked as cell 922) as a neighbor, and, in that case, any repeated occurrence of a neighboring cell may be removed.

The determined information in relation to second-order neighboring cells can be used to identify hidden nodes, e.g., nodes that are proximate to the serving node but cannot be seen by the NLM or OOB detection units of the serving node/cell due to obstacles. For example, although the cell 922 (FAP #1) is located proximate to the serving cell 910, the cell 910 may not be able to detect it (based on the cell's 910 NLM or OOB detection units) because the cell 922 and the serving cell 910 are located on different sides of an obstacle 930 and thus do not have a direct line-of-sight awareness of each other. However, a UE 902 may be able to "see," at its illustrated location in FIG. 9, both the serving cell 910 and the hidden cell 920. The information exchanged between small cells, which may include neighboring information, can therefore be used to identify hidden cells and thus to enable configuring all (or most) existing cells in a geographical area based on that information. For example, using this information can enable to avoid using the same primary scrambling code (PSC) by two or more cells within a geographical area (which could confuse a UE).

In a network (e.g., heterogeneous network) that includes small-area/low-power nodes, unplanned cell deployment and fewer primary scrambling codes (PSC) being reserved for the cells may make it difficult for an operator/HMS to provide mapping between the PSCs and cell identities. Conventional self-configuration of PSCs based on NLM measurements may not solve this problem entirely because, as noted, neighbor lists obtained by the NLM may not be complete. That is, the low-power node may not be able to detect all its neighboring FAPs by way of the NLM alone, or even with OOB detection units. However, by utilizing cell-to-cell communication links, as described herein, to exchange information between various small cells within a particular geographic region, a PSC re-use plan may be coordinated in a distributed fashion. That is, cell-to-cell communication can assist in obtaining the PSC, the cell identity and other broadcast information of neighboring small cells (low-power nodes). This information may supplement information otherwise obtained, for example, using information-gathering functionality of a cell's NLM detection unit or information from UE reports (e.g., cell ID and PSC for devices supporting 3GPP Release 9 standard, or only PSC for devices supporting pre-Release 9 3GPP standard. Thus, with this information, a small cell may select a PSC not used by any of its first and preferably second order neighbors. In this way, the "hidden node problem" can be reduced or eliminated, since a neighboring small cell would report a colliding PSC. Accordingly, automatic configuration of a network of small cells, for communication with one or more UEs, based on information exchanged through cell-to-cell communication links may include determining and/or assigning non-conflicting PSC to small cells within a geographic area (including to cells that may be hidden from a given small cell within the particular geographic area) in which the small-area-cell network is (or will be) formed Automatic configuration of the small cells may also include determining power attributes of the various small cells that are included in the small cell network to be formed. For example, conventional NLM-based power calibration (NLPC) generally assumes that the RF conditions measured at a small cell are identical to those observed by users at the edge of the desired coverage range. However, there may be significant mismatches in RF conditions measured by a small cell(s), and those conditions observed by the UE served by the small cell(s). Thus, in some embodiments, neighboring small-cells may utilize the cell-to-cell communication links described herein to exchange information to improve power calibration. For example, neighboring cells may exchange measured received signal strength of neighboring small-cells and macro cells (e.g., information such as received signal strength indication, or RSSI, which is an indication of a signal power level of a signal received by an antenna of the mobile device, pilot channel, or CPICH, measurements, received signal code power, or RSCP, measurements, etc.). Furthermore, neighboring cells may exchange location information. In some embodiments, the information exchanged between cells may include a primary scrambling code (PSC) for at least one of a first small cell and an identified at least one neighbor small cell. In such embodiments, another PSC for another of the first small cell and the identified at least one neighbor small cell may be determined based on the PSC in the exchanged information.

By basing, at least in part, power determination/calibration for individual cells on information exchanged between individual cells, area overlap regions between coverage areas may be kept to a desired extent/values. That is, dynamic transmit power calibration by small cells can optimize, or near-optimized, the coverage of small cells, reducing or preventing/inhibiting pilot pollution, and facilitating an inter-cell interference management scheme.

In another example, by utilizing the cell-to-cell communication links described herein, functionality, such as femto "self-healing" may be enabled. That is, if any small cell (e.g., femtocell) is detected and determined to be non-operational by one or more neighboring cells/nodes, that information may be shared among neighboring small cells, such that other cells may increase or suitably adjust their transmit powers to maintain coverage. When the non-operational small cell becomes operational, the cell's restored operability is sensed/detected and the information is shared between neighboring small cells, such that other small cells may reduce their transmit power and shrink back to their original coverage. Additional configuration parameters for a particular small cell that may be determined based on information exchanged between the small cells may include the following parameters (which may be arranged in a system information block, or SIB): femto cell ID (in implementations in which the small cell is a femto cell), downlink UMTS absolute radio frequency channel number (UARFCN), power offset between paging indicator channel (PICH) and acquisition indicator channel (AICH), uplink interference for the particular cell, neighbor cell list for the particular cell, and cell re-selection parameters, which may include threshold to determine whether the particular cell is suitable for camping by a UE, cell reselection threshold value, cell reselection hysteresis value, and maximum uplink transmit power allowed for the particular cell.

In some embodiments, an "extended small cell set" (ESCS), such as an "extended femto set" (EFS) may be created. Here, the EFS may be similar to an "extended service set" (ESS) utilized in 802.11 communications. The EFS may be established based on information exchanged via cell-to-cell communication links to form a cluster. Such an EFS may enable contiguous RF coverage over a relatively large area corresponding to the cluster of small cells (low-power nodes), providing for seamless mobility of UEs within the cluster. In some implementations, the cluster corresponding to the EFS, and all UEs served by small cells in the EFS, may be viewed as a single network where all UEs are stationary. That is, the EFS can hide the mobility of the UEs within the cluster service area from other network entities outside the EFS. Thus, a HNB-GW, (i.e., FAP-GW) can make handover decisions within the cluster and be the mobility anchor (also referred to as local mobility anchor (LMA)). In various embodiments, the EFS connects to the CN (e.g., 304, 354, 384 in FIGS. 3A-3C) via a cluster head of the EFS. A small cell may be selected as the cluster head, for example, as described in the disclosure.

Figure 10:
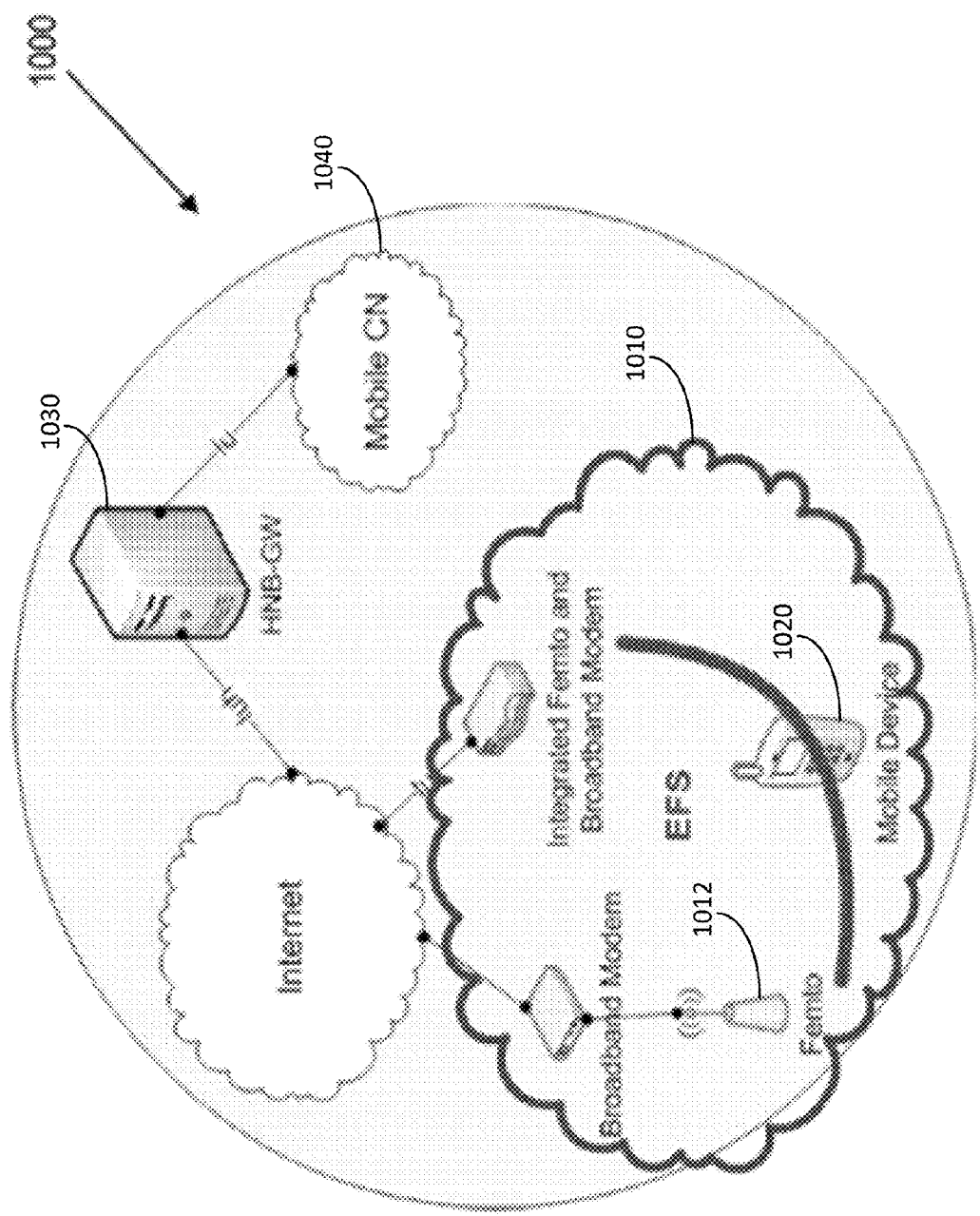
FIG. 10 is a diagram illustrating a network with an extended small cell set according to various embodiments.

With reference now to FIG. 10, a schematic diagram of a network 1000 with an exemplary ESCS (e.g., EFS) 1010 is shown. Here, neighbor small cells 1012, 1014 (e.g., HNBs 358, HeNBs 388 in FIGS. 3B-3C) share information with one another about proximate UEs 1020 (e.g., 360, 380 in FIGS. 3B-3C). This can assist candidate small cells in the EFS 1010 to prepare resources for potential handovers as needed. Furthermore, a soft handover may be enabled as small cells may belong to the same FAP-GW 1030 (e.g., HNB-GW 356, HeNB-GW 386 in FIGS. 3B-3C). Still further, traffic from one small cell may be forwarded to another small cell to facilitate the inter-FAP handovers.

Figure 11:
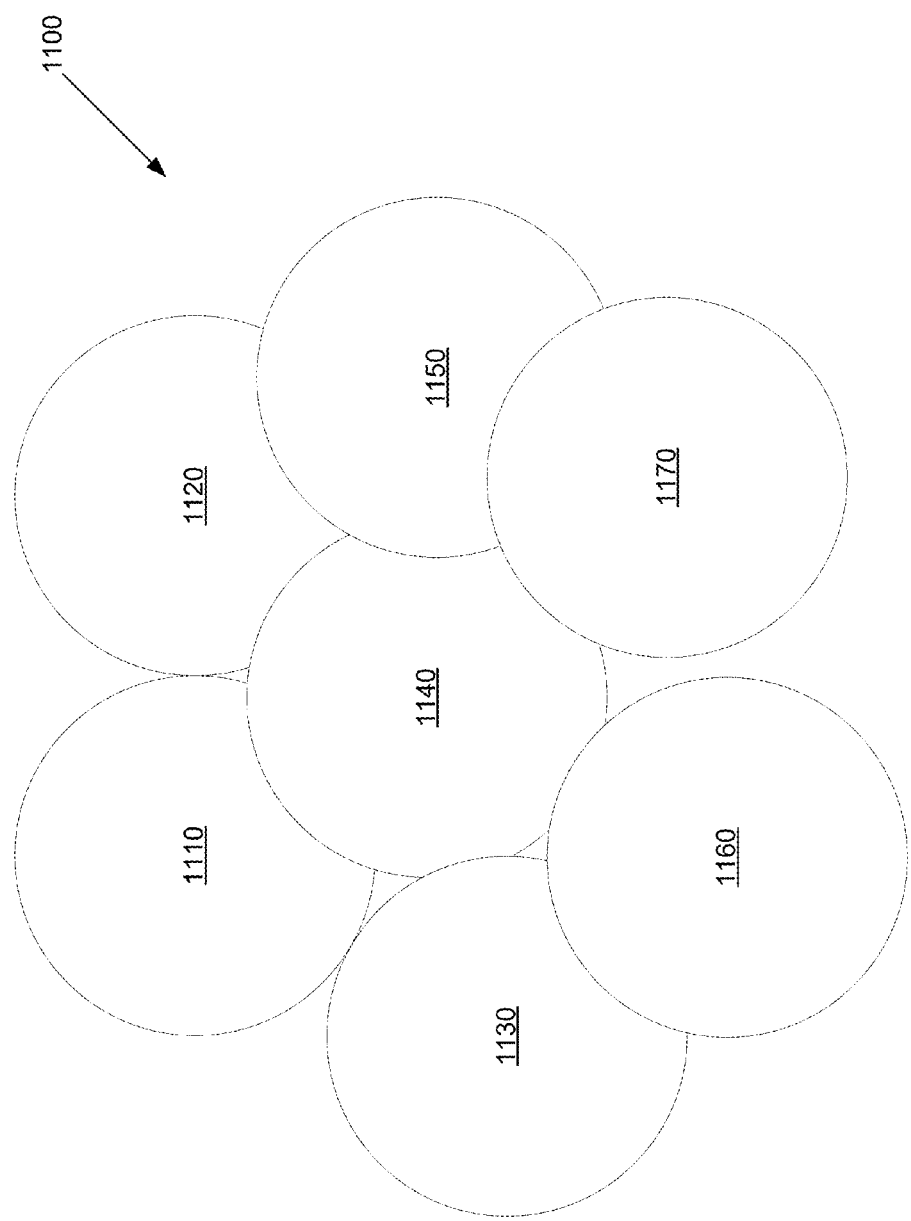
FIG. 11 illustrates an exemplary a cluster that may include a plurality of small cells according to various embodiments.

FIG. 11 illustrates an exemplary a cluster 1100 (e.g., ESCS) that may include a plurality of small cells (e.g., HNBs 358, HeNBs 388 in FIGS. 3B-3D), such a first small cell 1110, a second small cell 1120, a third small cell 1130, a fourth small cell 1140, a fifth small cell 1150, a sixth small cell 1160, and a seventh small cell 1170. It should be noted, however, that the cluster 1100 (or any other cluster herein discussed) can include any suitable number of small cells.

In various embodiments, one or more of the small cells within the cluster 1100 may be selected for one or more application based (at least) on information exchanged between the small cells of the cluster 1100.

In some embodiments, a cluster head is selected from among a cluster (e.g., an Extended Small Cell Set (ESCS)) of small cells. The cluster head connects the cluster of small cells to the core network (e.g., 304, 354 in FIGS. 3A-3B), which may be an evolved packet core (EPC) in the case of E-UTRAN (e.g., 384 in FIGS. 3C-3D). A selected cluster head is a regular small cell from among the cluster of small cells. The cluster head has minimal overhead for cluster head functionality. The cluster head (CH) is the point of attachment of the cluster to the core network. Accordingly, with fewer points of attachment to the core network and suppressing some signaling to the core network by using intra-cluster signaling, signal load of the core network may be reduced.

Figure 12A:
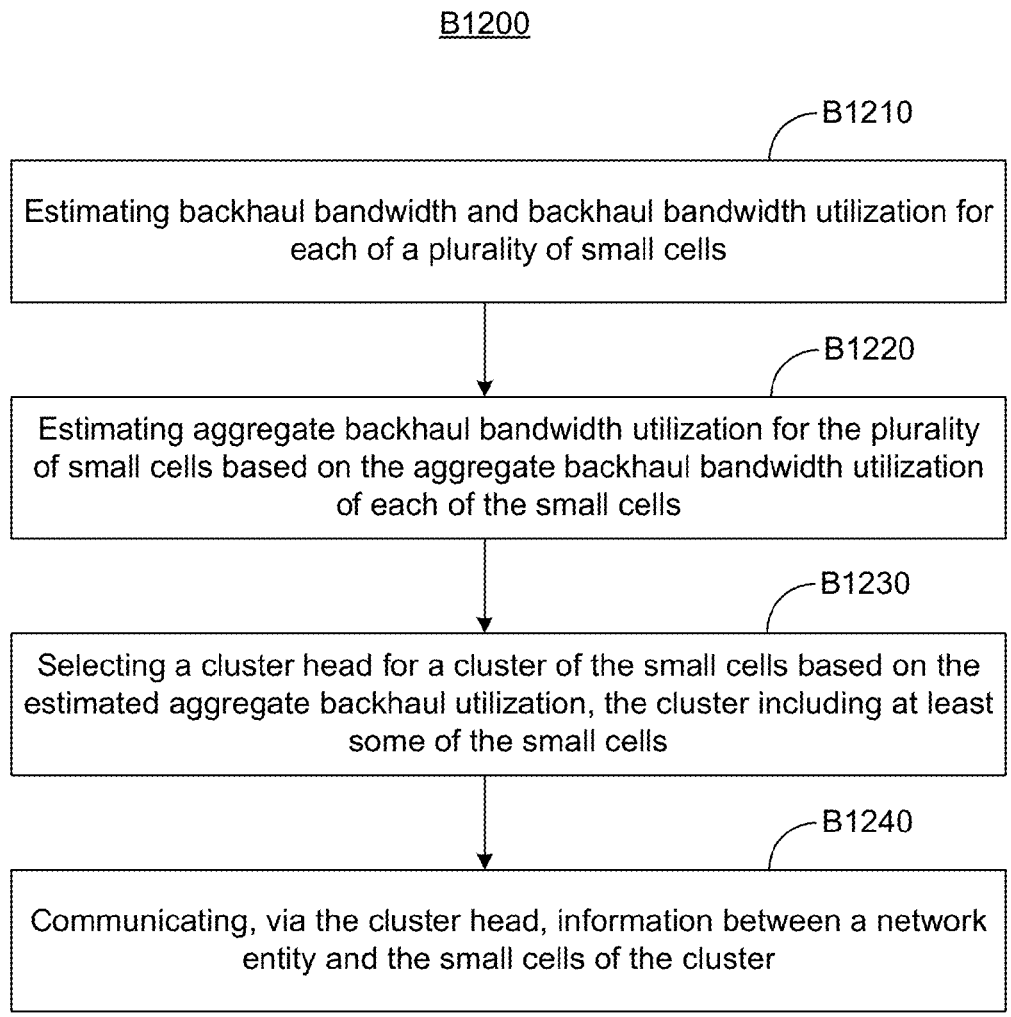
FIGS. 12A-12B illustrate a flowchart of a method for selecting a cluster head small cell according to various embodiments.

FIG. 12A is a flowchart showing a method B1200 for selecting a small cell as a cluster head of a cluster from among a cluster of small cells (also referred to as small cell devices, HNBs, HeNBs, etc.).

With reference to FIGS. 11-12A, at block B1210, each small cell in the cluster 1100 may estimate its own backhaul quality (bandwidth) and backhaul bandwidth utilization (percentage of bandwidth utilized). Each small cell 1110-1170 may exchange this information with the other cells in the cluster 1100.

At block B1220, based on information exchanged (backhaul bandwidth and backhaul bandwidth utilization) within the cluster 1100, each small cell may estimate aggregate backhaul bandwidth utilization (demand) for the cluster 1100. A small cell that can support the aggregate backhaul demand over its backhaul may qualify as a cluster head. For example, the first small cell 1110, the second small cell 1120, and the third small cell 1130 may qualify as candidates to be a cluster head of the cluster 1100. In some embodiments, the aggregate backhaul demand relates to both C-plane data and user-plane (U-plane) data. In other embodiments, the aggregate backhaul demand relates only to control-plane (C-plane) data. As such, the aggregate backhaul demand may be less than the demand for both C-plane and U-plane data.

In some embodiments, one or more other criteria or factors, for example in addition to the aggregate backhaul demand, for determining a cluster head may be considered. For instance, delay over the backhaul between the candidate cluster head and other small cells in the cluster 1100 may be considered. For example, an otherwise qualified small cell (e.g., the third small cell 1130) may be disqualified for the cluster head because the small cell would provide a backhaul delay that exceeds a predetermined threshold. Another factor, according to some embodiments, includes a number of hops between each small cell. For example, the second small cell 1120 may be disqualified for the cluster head because the second small cell 1120 would require at least two hops (or other predetermined number of hops) between the second small cell 1120 and one or more of the small cells in the cluster 1100. As such, cluster head candidates may be restricted to small cells that only have one-hop (or other predetermined number of hops) neighboring small cells. In some embodiments, the factor may be based on the size of the cluster. For example, if the size of a cluster is limited to four, a first cluster head may be selected for a cluster of four small cells and a second cluster head may be selected for a cluster of three small cells. In some embodiments, one of the factors may be based on a number of user equipment context transfers between the small cell and the other small cells of the cluster. In some embodiments, the one or more factors for determining cluster head selection may be based on the application for which the cluster head will be used. For example, a small cell with a tighter synchronization, for example as discussed in the disclosure, may qualify as the synchronization cluster head (i.e., the small cell that provides synchronization information to the small cells of the cluster that are not as synchronized).

At block B1230, one or more of the small cells in the cluster 1100 vote (select) a cluster head that satisfies all considered criteria (e.g., can support aggregate demand; minimal path delays; hops; and/or other factors). For example, the first small cell 1110 may be selected as the cluster head for the cluster 1100 because the first small cell 1110 can support the aggregate backhaul demand, provides an acceptable path delay, and has an acceptable number of hops to the other small cells. As such, the first small cell 1110, as the cluster head, would be the point of attachment of the cluster 1100 to the core network/EPC.

Accordingly, at block B1240, the cluster head (in this example, the first small cell 1110) can exchange (communicate) information between the other small cells and the core network (e.g., 304, 354, 384 in FIGS. 3A-3D) via the cluster head. As such, with fewer points of attachment to the core network (and suppressing some signaling to the core network by using intra cluster signaling), signal load of the core network may be reduced.

In particular embodiments, the criteria may limit the size of the cluster 1100. For instance, if no small cell satisfies all the considered criteria, the cluster 1100 may be fragmented into multiple cluster subsets. Thus, in some embodiments, more than one cluster head may be selected with a corresponding subset of cells (cluster subset). For instance, a first cluster head (e.g., the first small cell 1110) may be selected for a first cluster subset (e.g., the first small cell 1110, the third small cell 1130, the fourth small cell 1140, and the sixth small cell 1160) and a second cluster head (e.g., the second small cell 1120) may be selected for a second cluster subset (e.g., the second small cell 1220, the fifth small cell 1150, and the seventh small cell 1170. In other embodiments, more than one cluster head may be selected for the same cluster (or subset) of small cells.

The selected cluster head may be used with one or more different applications (e.g., KPI filtering, mobility (local mobility anchor), synchronization, spectrum coordination), examples of which are described in (but not limited to) the disclosure. For example, the first small cell 1110 may selected as the cluster head for a first application (e.g., KPI filtering) and a different small cell, such as the fourth small cell 1140, may be selected as the cluster head for a second application (e.g., mobility). Thus in some embodiments, different applications may use the same clusters and/or selected cluster head(s) from each other, and in other embodiments, different applications may use different clusters and/or selected cluster head(s) from each other. A given small cell may belong to different clusters for different applications. For example, the third small cell 1130 may belong to the first cluster subset (e.g., of which the first small cell 1110 is the first cluster head) for a first application and belong to the second cluster subset (e.g., of which the second small cell 1120 is the second cluster head) for a second application. In particular embodiments, a size of the cluster may vary based on the application. For example, for a first application, a single cluster may be used that includes the small cells 1110-1170, and for a second application, a first cluster subset that includes five small cells and a second cluster subset that includes two small cells may be used.

In some embodiments, cluster subsets may have possible overlapping layouts (i.e., one or more cells may belong to more than one cluster subset). For example, the third small cell 1130 may belong to the first cluster subset (e.g., of which the first small cell 1110 is the first cluster head) and the second cluster subset (e.g., of which the second small cell 1120 is the second cluster head).

In various embodiments, the small cells in a cluster belong to a single operator. In other embodiments, the small cells in a cluster belong to multiple operators. In such embodiments, for example, there may be a spectrum coordination or the like between the multiple operators.

In some embodiments, the cluster head does both control-plane (C-plane) and user-plane (U-plane) aggregation for the cluster 1100. In such embodiments, the cluster head forwards C-plane and U-plane traffic (data) for the small cells of the cluster 1100. In other embodiments, the cluster head only does C-plane aggregation for the cluster 1100. In such embodiments, U-plane traffic may be handled by the individual small cells of the cluster 1100. Such embodiments may be implemented, for example, when the cluster head backhaul is limited and/or the individual small cells of the cluster have sufficient backhaul.

The method B1200 may be triggered or otherwise performed at any suitable time and/or in response to a predetermined event, such as (but not limited to), expiration of a time-based threshold (e.g., triggering the method after a predetermined amount of time has elapsed since the method was performed), detection of a presence of new small cell, detection of an absence of one or more of the cells in the cluster 1100, and/or the like. In particular embodiments, the method B1200 (reselection of a new cluster head(s)) may be repeated any time efficiency gained by the reselection is determined to outweigh a cost of performing the reselection.

Figure 12B:
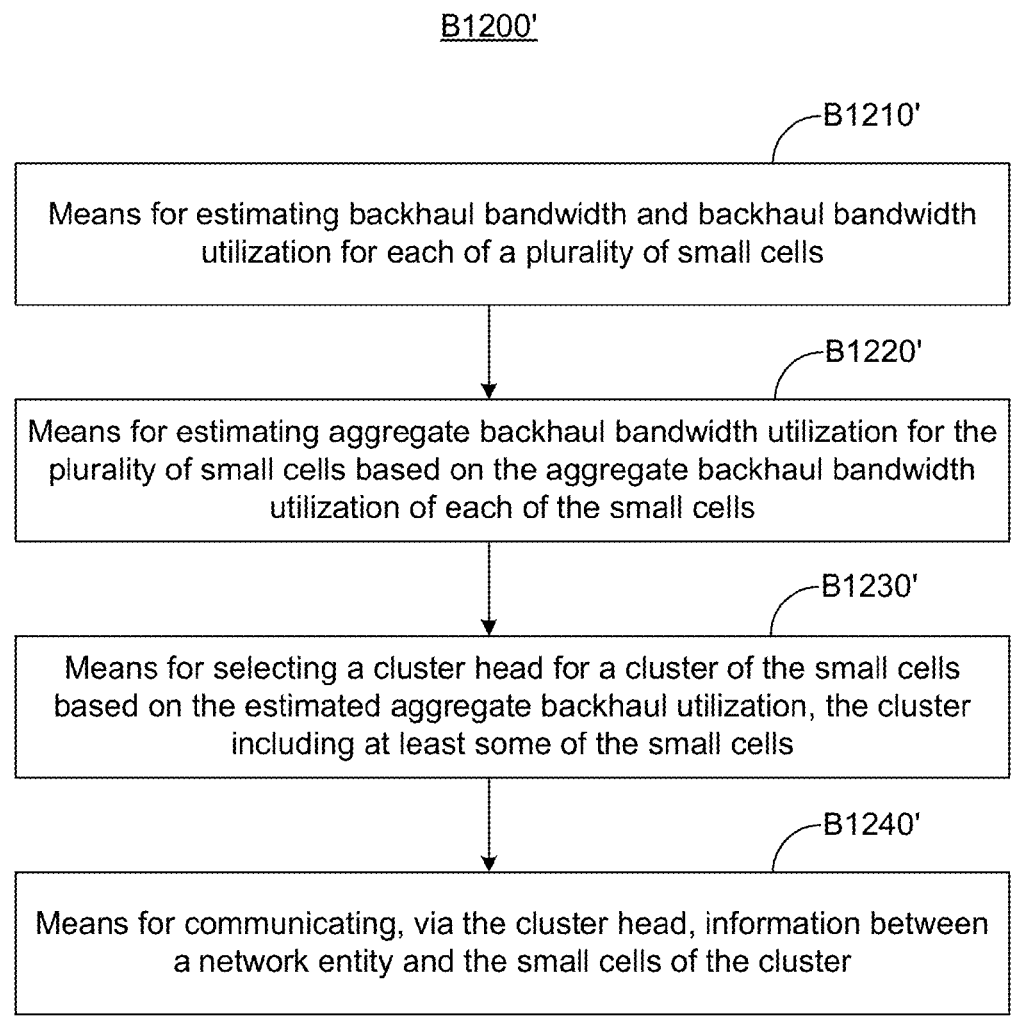
Figure 12C:
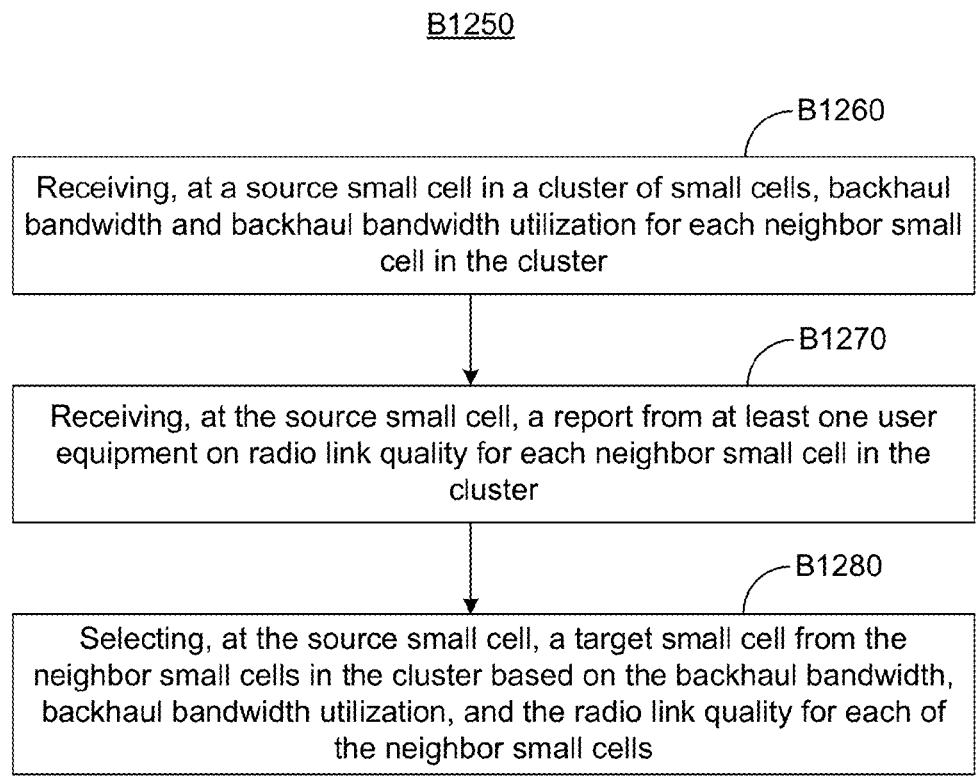
FIG. 12C illustrates a flowchart of a method for selecting a target small cell of a cluster during handover according to various embodiments.

The method B1200 described in FIG. 12A above may be performed by various hardware and/or software component(s) and/or module(s) corresponding to the means-plus-function blocks B1200' illustrated in FIG. 12B. In other words, blocks B1210 through B1240 illustrated in FIG. 12A correspond to means-plus-function blocks B1210' through B1240' illustrated in FIG. 12B.

With reference to FIGS. 11-12B, in various embodiments, a cluster head may be selected for managing key performance indicators (KPIs) for the cluster 1100.

Figure 3C:
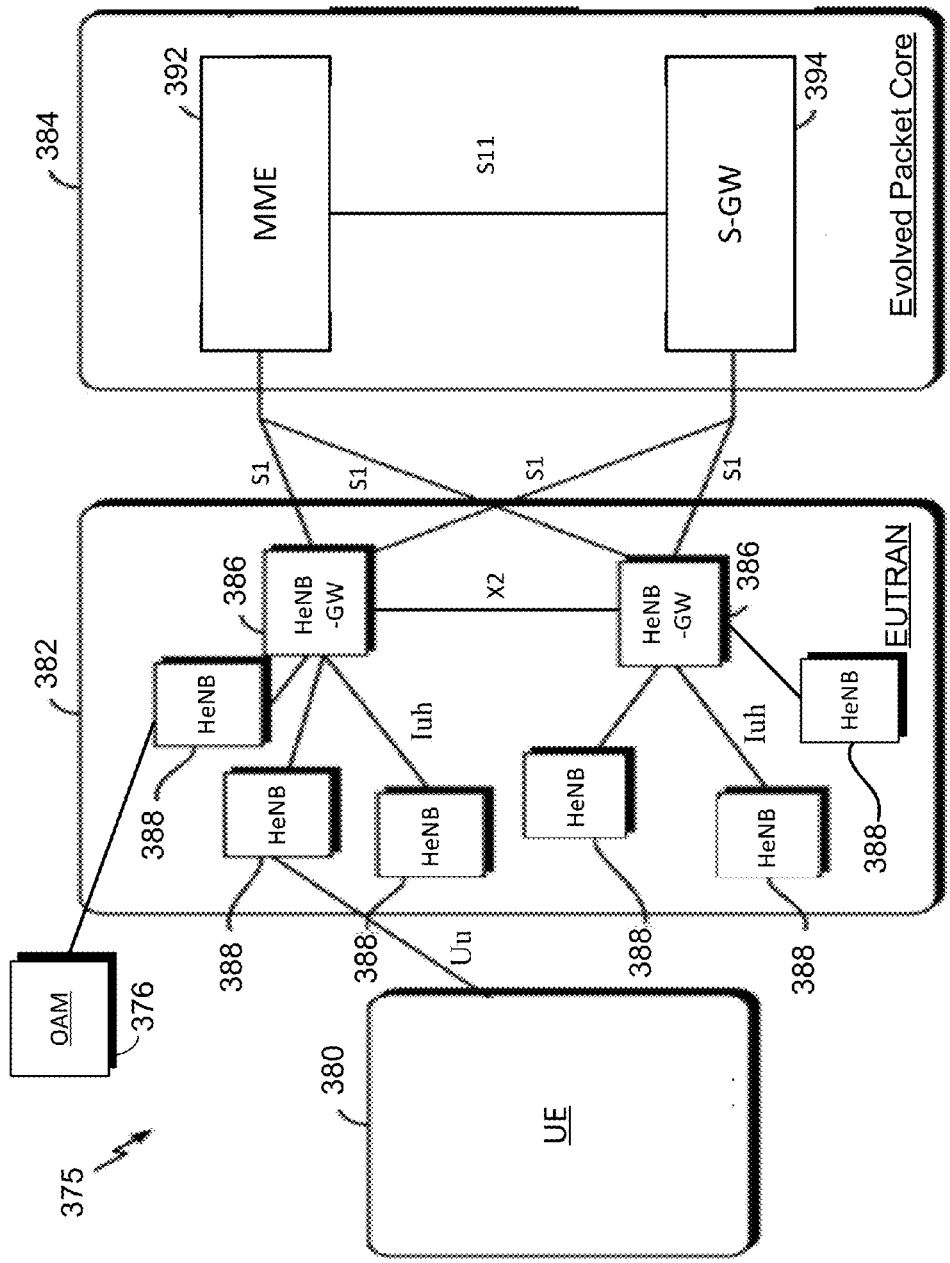
FIG. 3C is a diagram illustrating an example of a telecommunication system according to various embodiments.
Figure 3D:
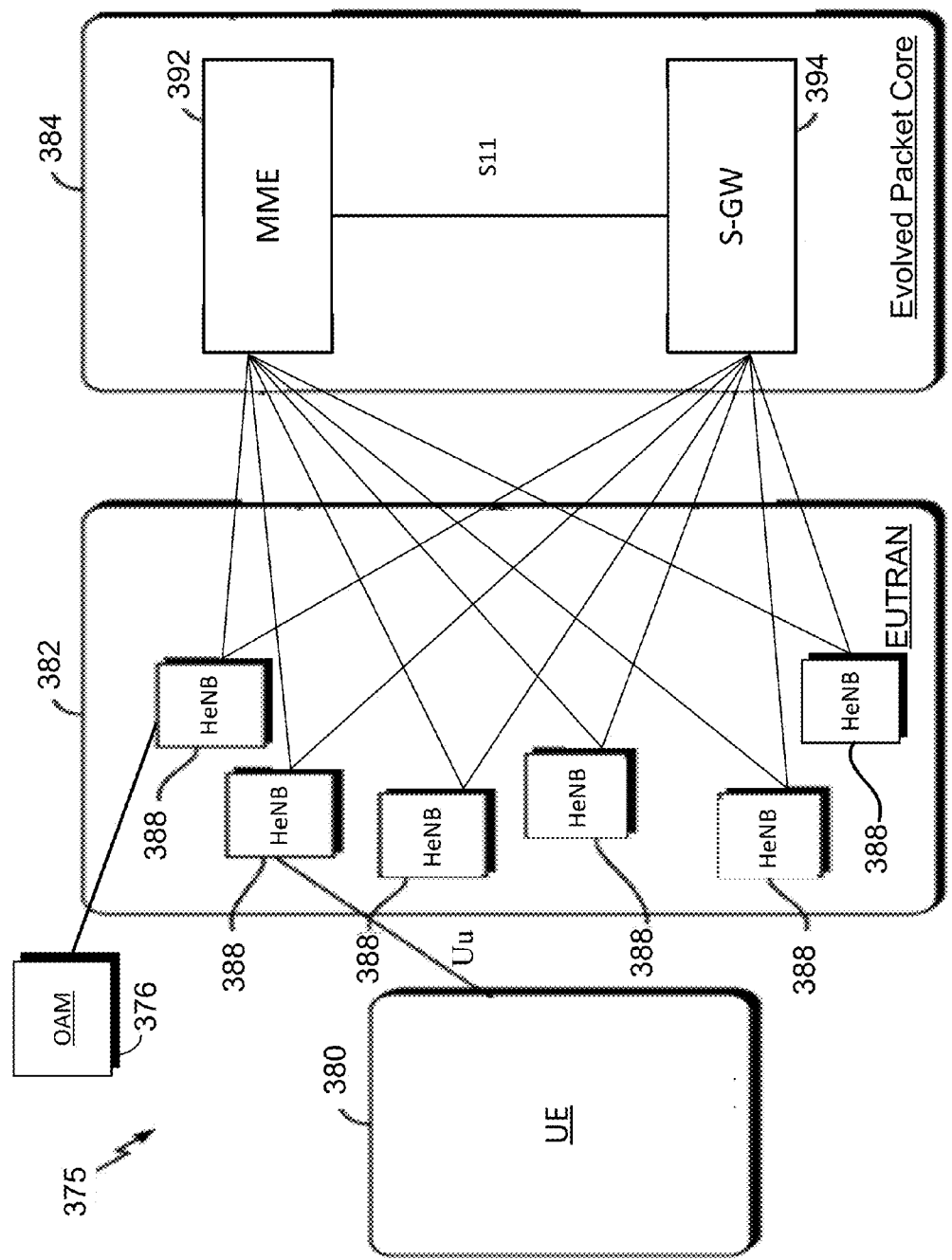
FIG. 3D is a diagram illustrating an example of a telecommunication system according to various embodiments.

In some embodiments, the cluster head sends one or more KPIs for the cluster to an operation administration and maintenance (OAM) entity (e.g., 376 in FIGS. 3C-3D). In particular, not all the KPIs of each small cell need be passed to the OAM entity for processing thereof. As such, in some embodiments, the cluster head can obtain (aggregate) the KPIs (or other information from which the KPIs can be derived) from each of the small cells and send the aggregate information to the OAM entity. Accordingly, by aggregating and filtering KPIs, burden on the OAM entity can be eased. Examples of small cell KPIs include, but are not limited to, aggregate time average backhaul utilization for each of the small cell devices of the cluster 1100 and aggregate time average radio resource utilization for each of the small cell devices of the cluster 1100.

In some embodiments, because the OAM entity may consider the cluster to be essentially a macro network (e.g., macro NodeB or macro eNodeB), only the cluster-level metrics (as opposed to metrics (KPIs) relating to individual small cells of the cluster) need be sent to the OAM entity. Examples of cluster KPIs include, but are not limited to, physical cell identity (PCI) collision in cluster 1100; aggregate time average backhaul utilization (S1 transport network layer (TNL) load) for the cluster 1100; aggregate time average radio resource utilization for the cluster 1100; latency and jitter experienced by the cluster 1100; handover (HO) statistics for the cluster 1100; number of radio access bearer (RAB) setup failure to load or the like; paging success rate in the cluster 1100; etc. HO statistics for the cluster 1100 may include, but are not limited to, number of HO attempts; number of HO failures; number of premature HO; number of measurement gaps for inter-frequency handover (IFHO) (i.e., outbound HO from the cluster).

Figure 13:
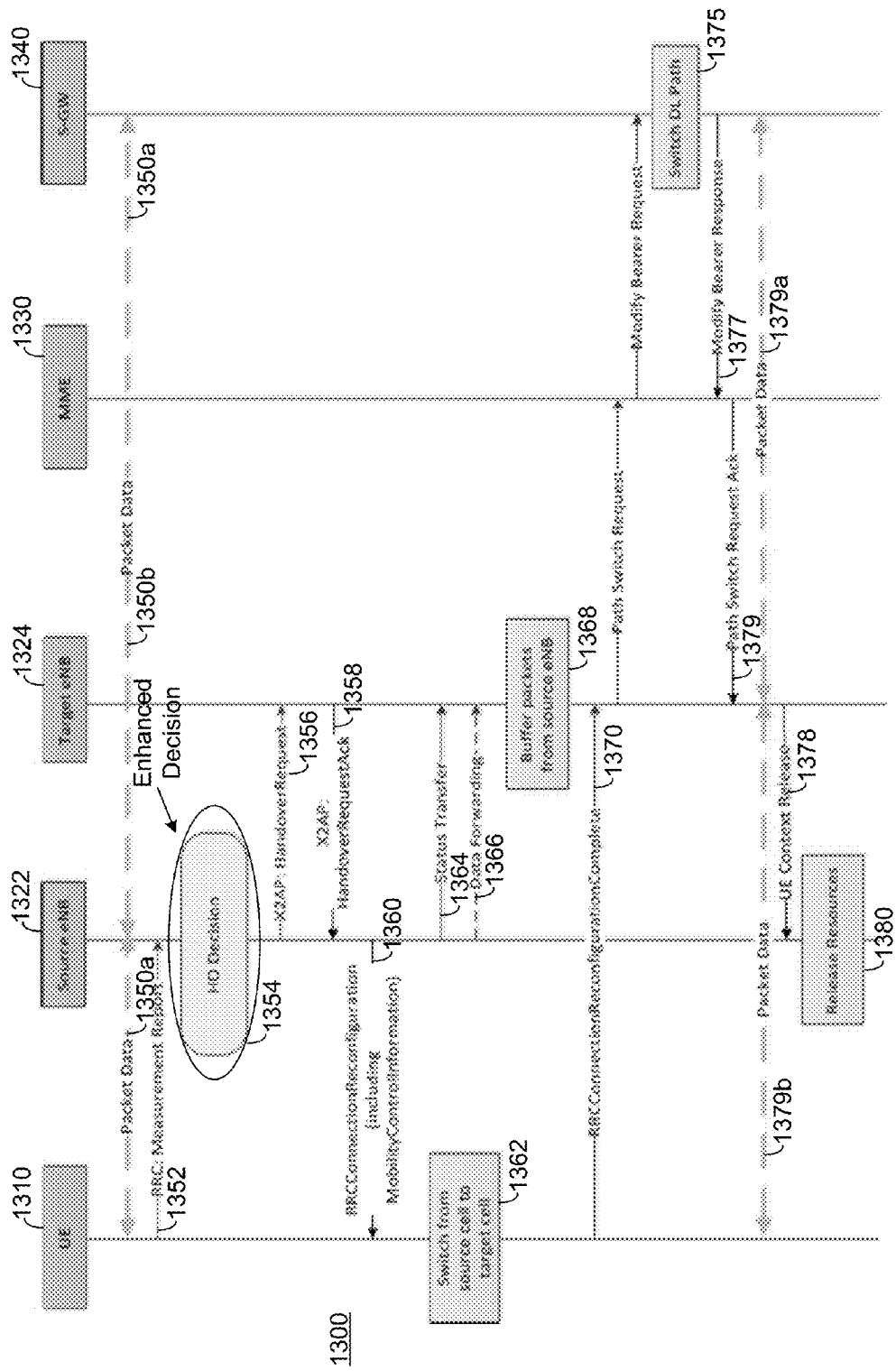
FIG. 13 illustrates a call flow for performing handover according to various embodiments.

In various embodiments, one or more of the small cells (e.g., HeNB 388 in FIGS. 3C-3D; 1110-1170) within a cluster (e.g., 1100) may be selected as a target small cell by a source small cell (also referred to as a serving small cell) of the cluster for handover based (at least) on information exchanged between the small cells of the cluster. For instance, such handover may be performed according to method B1250 of FIG. 12C or the like. FIG. 13 illustrates a call flow for performing handover of a UE 1310 (e.g., 380 in FIGS. 3C-3D) in a cluster 1320 (e.g., 1100) having a plurality of small cells (e.g., 1110-1170). In particular, a source small cell 1322 (e.g., the first small cell 1110 in FIG. 11) in the cluster 1320 may select a target small cell 1324 (e.g., the second small cell 1120 in FIG. 11) from among the other small cells (neighbor small cells) in the cluster 1320 to handover the UE 1310.

With reference to FIGS. 11-13, according to the method B1250, at block B1260, each small cell in the cluster 1320 may advertise (e.g., exchange cell information via a cell-to-cell communication link, such as any of the cell-to-cell links described herein) its backhaul connectivity speed (bandwidth), which may corresponding to a parameter $fb_i$, and may further advertise its current percentage of utilization of its backhaul bandwidth (corresponding a parameter $fbu_i$). The variables $fb_i$ and $fbu_i$ may be advertised, for example, on an OOB link, (e.g., a WiFi link to neighbor small cells) or the like. For instance, the 802.11u standard supports the Access Network Query Protocol (ANQP), which provides a range of information such as the network authentication types supported, venue name, roaming agreements in place. In some embodiments, each of the small cells may also advertise their respective radio resource utilization (corresponding to a parameter $fru_i$). Accordingly, the source small cell 1322 may receive the backhaul bandwidth, backhaul bandwidth utilization, and radio resource utilization from each of the neighbor small cells of the cluster 1320.

During handover, at block B1270, the source small cell 1322 receives from at least one UE 1310 (e.g., 380 in FIGS. 3C-3D) a report (1352 in FIG. 13) on radio link quality of each of the neighbor small cells in the cluster 1320.

Accordingly, at block B1280, the source small cell 1322 makes an enhanced decision (1354 in FIG. 13) as to which of the neighbor small cells in the cluster 1320 to select for the target small cell 1324. In particular embodiments, the source small cell 1322 selects a small cell from among the neighbor small cells to be the target small cell 1324 based on the backhaul bandwidth, backhaul bandwidth utilization, radio resource utilization, and the radio link quality of each of the neighbor small cells. In other embodiments, the enhanced decision may be made using a different number (e.g., based on the backhaul bandwidth, backhaul utilization, and the radio link quality of each of the neighbor small cells) and/or other factors. In yet other embodiments, any other suitable metric(s) may be used for selecting the target small cell 1324.

In particular embodiments, selection of the target small cell 1324 from among the neighbor small cells may include computing for each of the cells being considered a corresponding selection metric according to a relationship of min $\{(1-fbu_i)*fb_i, (1-fru_i)*fr_i\}$, where $fbu_i$ represents the percentage backhaul utilization for an $i^{th}$ small cell; $fb_i$ represent the backhaul connectivity speed for the $i^{th}$ small cell; $fr_i$, represents the radio link quality for the $i^{th}$ small cell; and $fru_i$ represents the radio link utilization for the $i^{th}$ small cell. The small cell that is selected (from the cells being considered) may be the one that is associated with a maximum computed selection metric.

Thus, in particular embodiments, a source small cell 1322 may determine a target small cell 1324 for handover based at least on the information exchanged between the small cells of the cluster 1320 and radio resource control (RRC) measurement reports received by the source small cell 1322.

In various embodiments, a cluster (e.g., 1100) may include a selected small cell that is a local mobility anchor (LMA) for assisting with mobility of a UE (e.g., 360, 380) associated with the cluster. In particular, traffic between the core network (EPC) (e.g., 354, 384) and the cluster may be tunneled to the selected small cell (LMA). Accordingly, the LMA can minimize the signaling to the core network and inter-cell UE context transfers, which occur as the UE moves from one small cell to another small cell in the cluster 1100.

In particular embodiments, a small cell that is a cluster head may be selected, for example as described in the disclosure, to be the LMA. Accordingly, the cluster head may serve as an intra-cluster path switch (e.g., for both U-plane and C-plane data; or only C-plane data). For instance, the LMA may communicate information (e.g., data packets) between a network entity (core network), such as the S-GW (e.g., 392) or MME (e.g., 394), and a source small cell within the cluster 1100, and then in response to handover of the UE 380 to a target small cell in the cluster 1100, the LMA may communicate information between the network entity and the target small cell. In some embodiments, the cluster head selected to be the LMA may be the same cluster head selected for one or more other applications (e.g., KPI filtering). In other embodiments, the cluster head selected to be the LMA may be a different cluster head from that selected for one or more other applications.

Figure 14A:
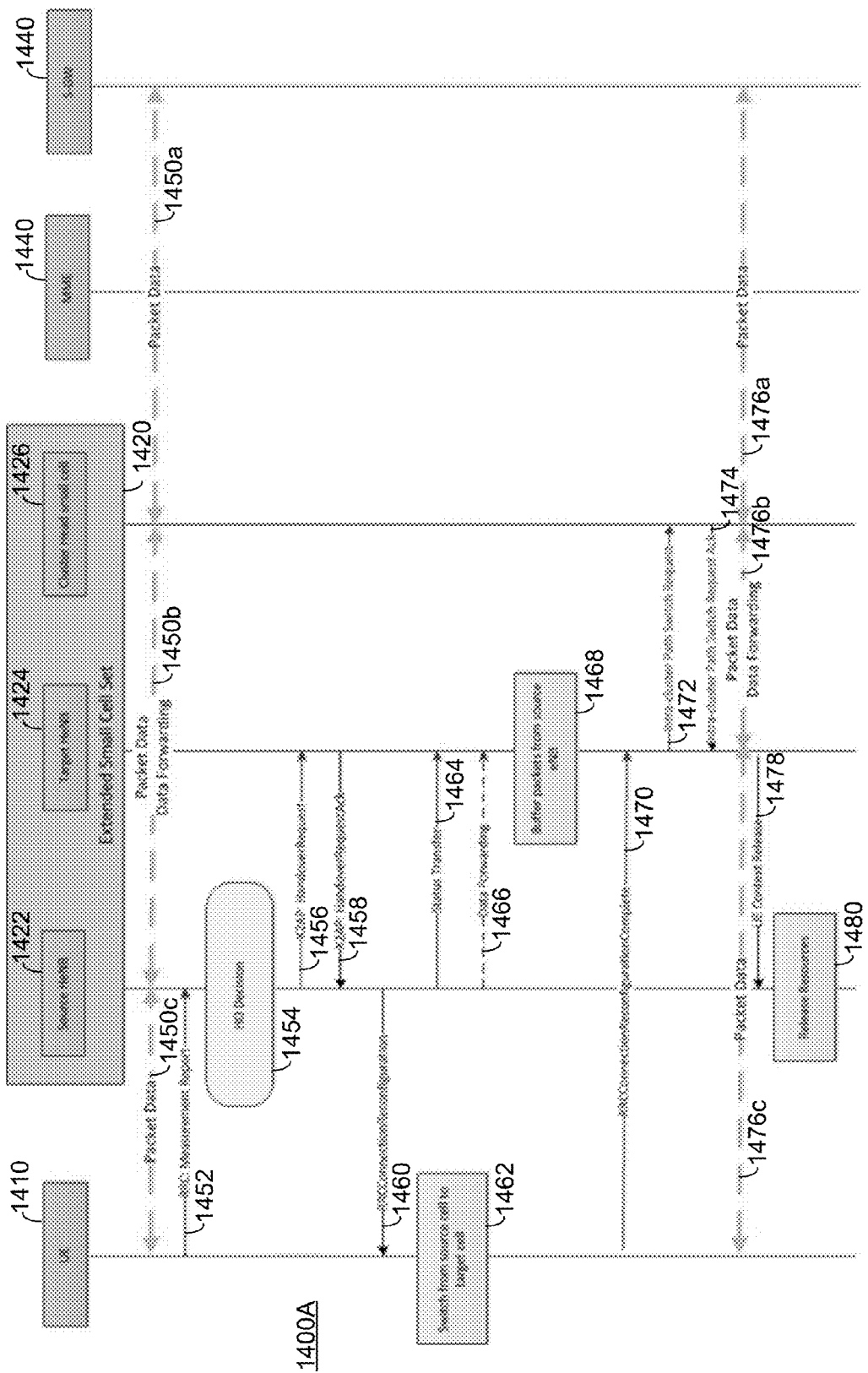
FIG. 14A illustrates a call flow for performing handover according to various embodiments.

FIG. 14A illustrates a call flow 1400A for performing intra-cluster handover of a UE 1410 (e.g., 380 in FIGS. 3C-3D) in a cluster 1420 (e.g., 1100) having a plurality of small cells (e.g., 1110-1170). In particular, a source small cell 1422 (e.g., the first small cell 1110 in FIG. 11) in the cluster 1420 may select a target small cell 1424 (e.g., the second small cell 1120 in FIG. 11) from among the other small cells (neighbor small cells) in the cluster 1420 to handover the UE 1410. With reference to FIGS. 11-14A, the source small cell 1422 and the target small cell 1424 belong to the cluster 1420 having a cluster head small cell 1426 (e.g., HeNB 388; the third small cell 1130 or the like). Prior to handover, data packets are communicated between a network entity (core network), such as a serving gateway (S-GW) 1440 (which may be similar to the S-GW 394 in FIGS. 3C-3D) or MME 1430 (which may be similar to the MME 392 in FIGS. 3C-3D), and the cluster head small cell 1426 (1450a), which then forwards the data packets to the source small cell 1422 (1450b), which exchanges the data packets with the UE 1410 (1450c).

The target small cell 1424 may send a request (1472) to the cluster head small cell 1426 for performing an intra-cluster path switch. The request may be performed, for example, after the UE 1410 is handed over from the source small cell 1422 to the target small cell 1424 (1462) (e.g., the target small cell 1424 receives a message from the UE 1410 indicating that RRC connection reconfiguration is complete (1470)). In response, the cluster head small cell 1426 may send an acknowledgement (1474) to switch a data-forwarding path from the source small cell 1422 to the target small cell 1424. As a result, a packet switch request/message does not need to be sent to the core network, thus reducing signaling load on the core network.

Accordingly, after handover, data packets are forwarded from the network entity (e.g., S-GW 1440, MME 1430) to the cluster head small cell 1426 (1476a), which then forwards the data packets to the target small cell 1424 (1476b), when then forwards the data packets to the UE 1410 (1476c).

In particular embodiments, the cluster head 1426 manages radio connections between the UE 1410 and the RAN (e.g., EUTRAN 382), including handling signaling and user traffic for a single UE (e.g., 1410) from the RAN. In some embodiments, the cluster head 1426 may be directly connected to the UE 1410. In other embodiments, another small cell of the cluster 1420 may be connected to the UE 1410. That is, such a small cell may be an intermediate cell between the cluster head 1426 and the UE 1410.

Figure 14B:
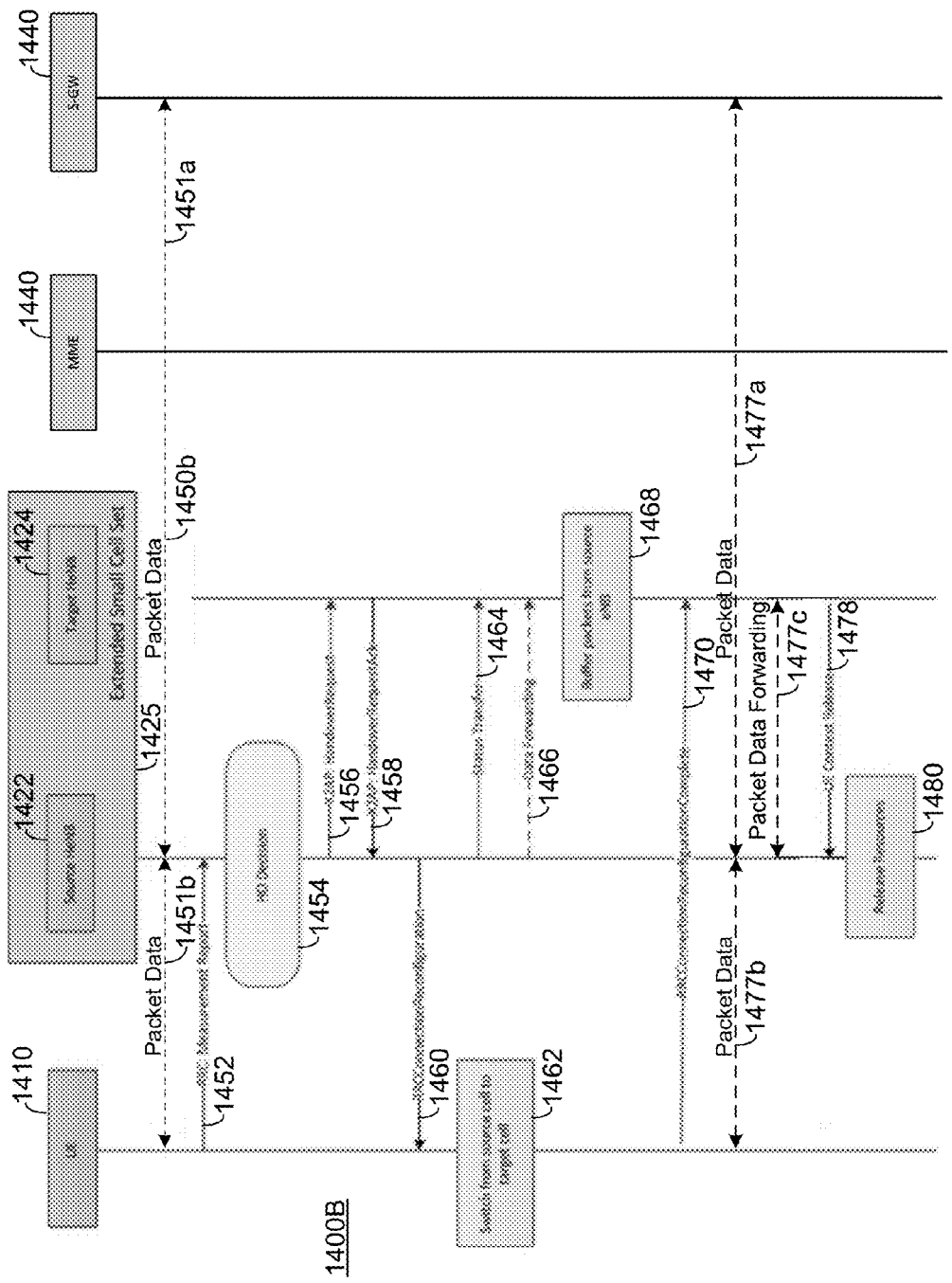
FIG. 14B illustrates a call flow for performing handover according to various embodiments.

In some embodiments, the LMA may be a different small cell from that of the cluster head. For instance, the LMA may be the source (serving) small cell. FIG. 14B illustrates a call flow 1400B for performing intra-cluster handover of the UE 1410 in a cluster 1425 having a plurality of small cells (e.g., 1110-1170). In particular, the source small cell 1422 in the cluster 1425 may serve as the LMA for the cluster 1425. With reference to FIGS. 1-14B, prior to handover, data packets are exchanged between the network entity, such as the serving gateway (S-GW) 1440 or MME 1430 and the source small cell 1422 (1451a). Accordingly, data packets are communicated between the source small cell 1422 and the UE 1410 (1451b). After handover, data packets are forwarded from the source target small cell 1422 (1477b) to the target small cell 1424 (1477c).

Figure 15A:
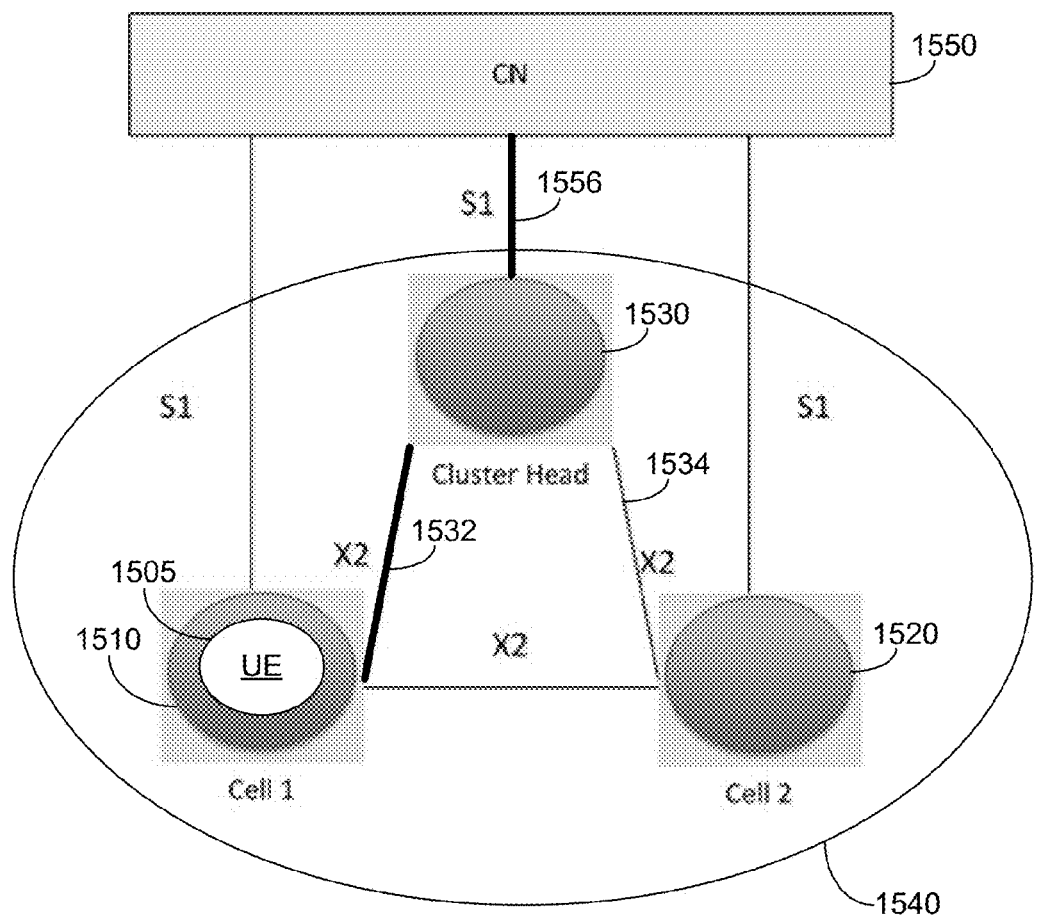
FIGS. 15A-15B illustrate a diagram relating to handover according to various embodiments.
Figure 15B:
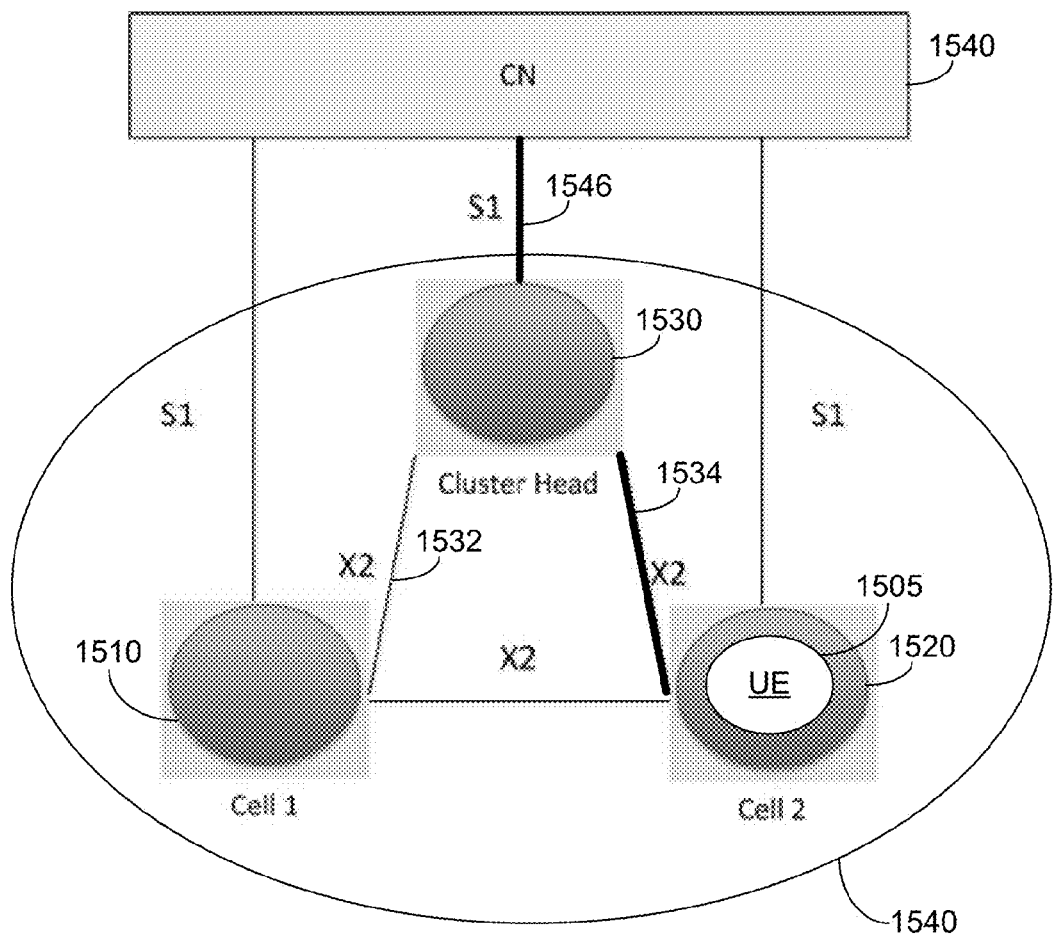

FIGS. 15A and 15B show signaling and data paths for intra-cluster handover. A cluster 1540 (e.g., 1420 in FIG. 14A) includes a plurality of small cells, such as a first small cell 1510, a second small cell 1520, a third small cell 1530, which may be the cluster head of the cluster 1540. As shown in FIG. 15A, first, UE 1505 (e.g., 1410 in FIG. 14A) has a radio link with the first small cell 1510 (e.g., the source small cell 1422 in FIG. 14A) of the cluster 1540. The UE 1505 receives data from the cluster head 1530, which receives data from a core network 1550 (e.g., 304, 354, 384 in FIGS. 3A-3D) via an S1 interface 1546, via an X2 interface 1532. Then, when the UE 1505 moves to the second small cell 1520 (e.g., the target small cell 1424 in FIG. 14A) of the cluster 1540, as shown in FIG. 15B, the UE 1505 receives data from the cluster head 1530 (i.e., the point of attachment to the core network 1550) over an X2 interface 1534. Thus, during the intra-cluster handover, the cluster head 1530 continues to be associated with the core network 1550 via the S1 interface.

Figure 16A:
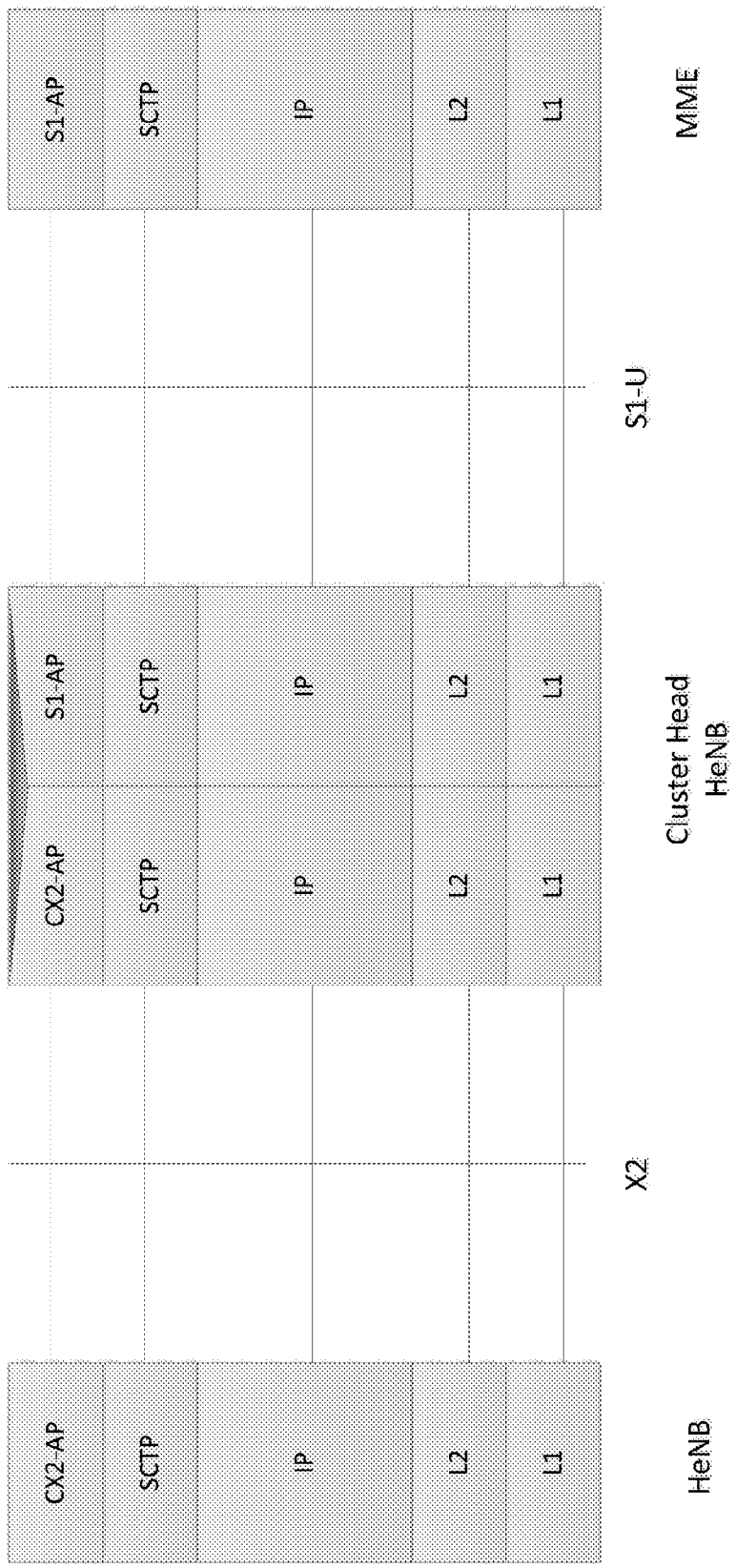
FIG. 16A illustrates a control-plane protocol stack according to various embodiments.

FIG. 16A illustrates a diagram of a protocol stack for the control plane for use with a cluster head small cell (e.g., 1530 in FIGS. 15A-15B) as described in (but not limited to) the disclosure. A cluster X2 application protocol (CX2-AP) is a protocol provided at the cluster head small cell and a small cell (e.g., HeNB, such as the source small cell 1422 or the target small cell 1424 in FIGS. 14A-14B). The CX2-AP tunnels S1 application protocol (S1-AP) messages between the small cell and the cluster head small cell over the X2 interface. In some embodiments, a small cell gateway (GW) (e.g., HeNB-GW 386 in FIG. 3C) can optionally be arranged between the cluster head small cell and the MME (e.g., 1430 in FIGS. 14A-14B; 392 in FIG. 3C).

Figure 16B:
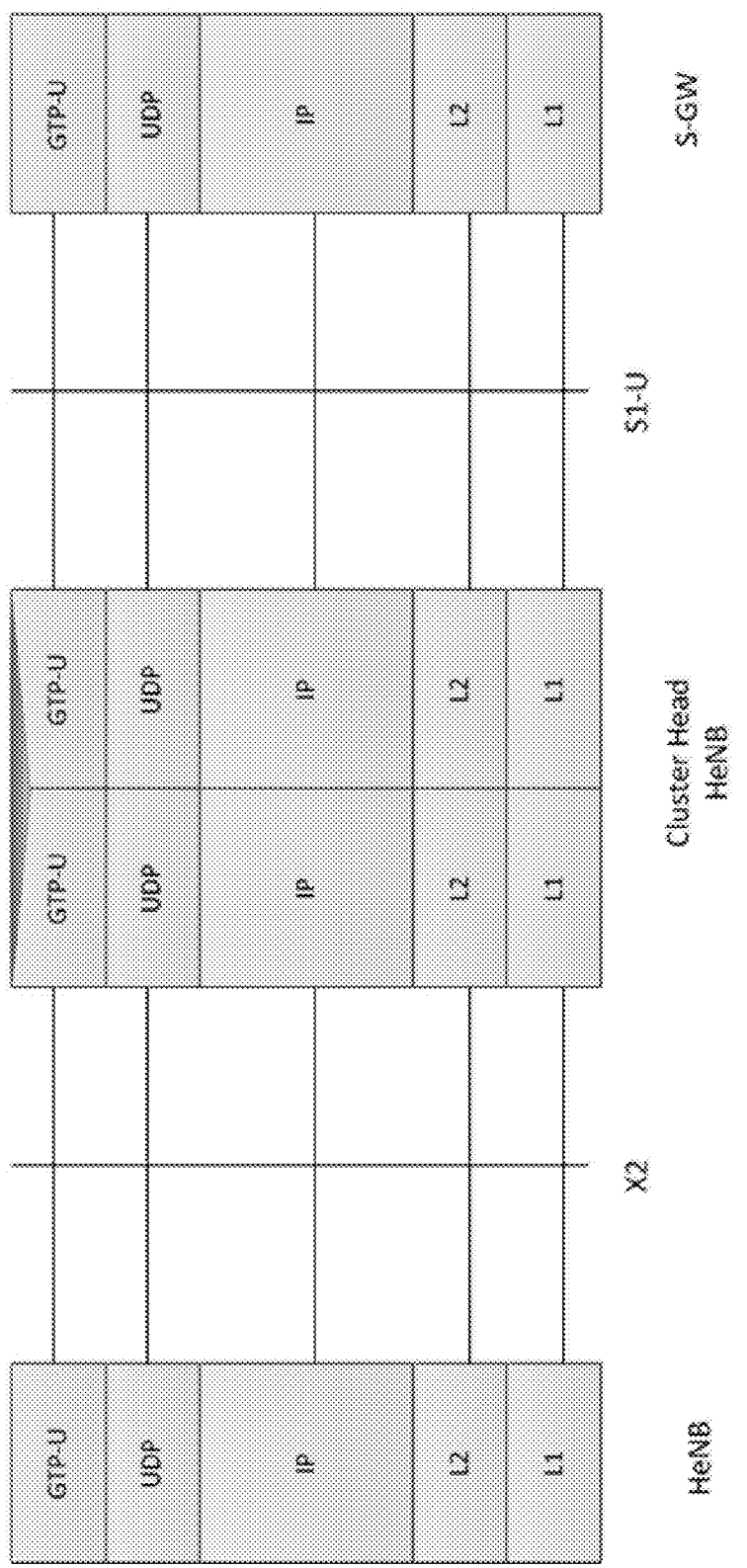
FIG. 16B illustrates a user-plane protocol stack according to various embodiments.
Figure 17:
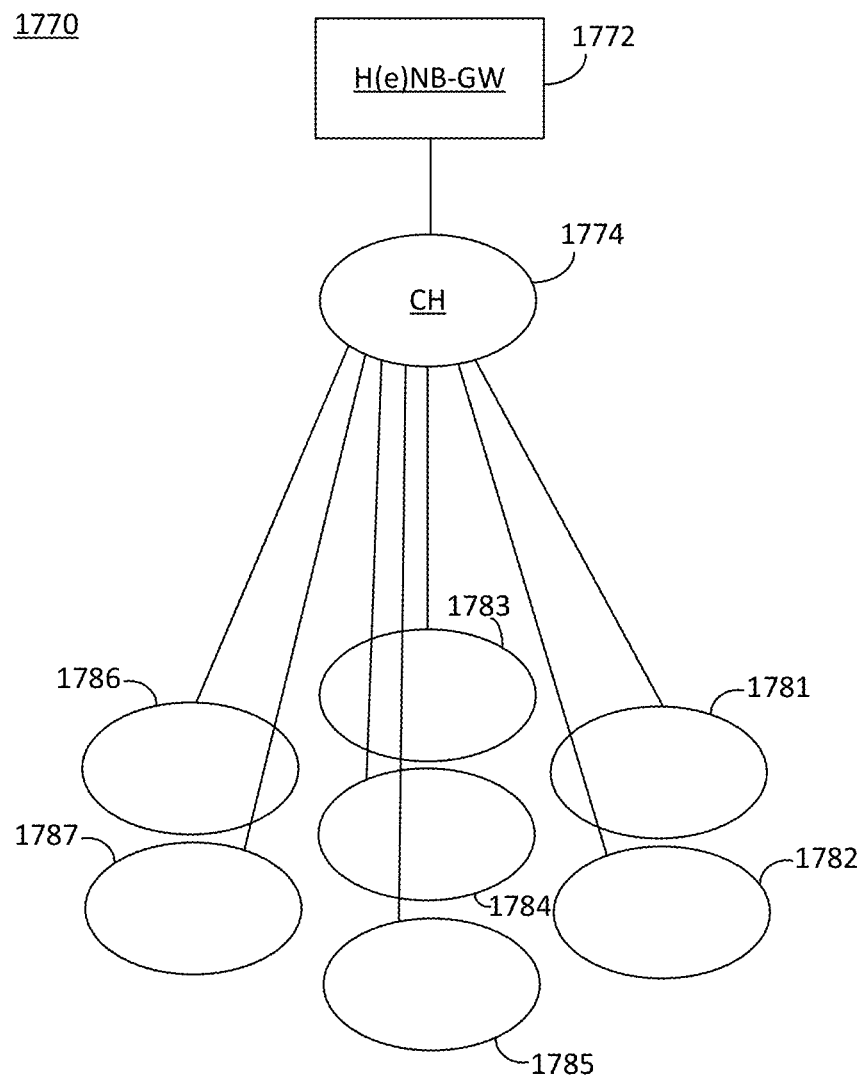
FIG. 17 illustrates a network environment according to various embodiments.

FIG. 16B illustrates a diagram of a protocol stack for user plane for use with a cluster head small cell (e.g., 1530 in FIGS. 15A-15B) as described in (but not limited to) the disclosure. As shown, according to various embodiments, a typical protocol stack for a user plane (U-plane) may be used. For instance, GTP-U (GPRS tunneling protocol for user-plane data) can be used to tunnel U-plane packet data units or the like between a given small cell (e.g., HeNB, such as the source small cell 1422 or the target small cell 1424 in FIGS. 14A-14B) and the cluster head small cell. Thus, according to various embodiments, no changes are needed to the user plane. In some embodiments, a small cell gateway (GW) (e.g., HeNB-GW 386 in FIG. 3C) can optionally be arranged between the cluster head small cell and the MME (e.g., 1430 in FIGS. 14A-14B; 392 in FIG. 3C).

With reference to FIGS. 11-16B, in some embodiments, during inbound handover (HO) (i.e., when the UE is handed over from a macro cell (or other cluster) to a target small cell within a cluster), the HO is handled by the target small cell (which may or may not be the cluster head). In particular embodiments, the cluster head may not be involved with the HO if the UE moves out of the cluster without being handed over between the small cells of the cluster. In other words, the cluster head may only assist with intra-cluster HO.

In some embodiments, the small cell that is the LMA can become the cluster head after inbound HO to the cluster. Accordingly, the cluster head (LMA) may then be involved with any intra-cluster HOs.

In some embodiments, the initial small cell to which the UE is handed over from a macro cell may also be the LMA.

In various embodiments, the LMA is involved only with the C-plane data while U-plane data is handled by the individual small cells of the cluster (e.g., S1-U interface is maintained between a source small cell and the MME). In some embodiments, the LMA is the cluster head of the cluster. For instance, S1-C MME connection may be maintained between the cluster head and the MME. In other embodiments, the LMA is not the cluster head of the cluster.

In some embodiments, UE context transfers may be minimized. UE context transfers may include static information and/or dynamic information (e.g., liste of established bearers, UE capabilities, etc.). For instance, a UE state (e.g., quality of service (QoS) settings, RAB settings, etc.) may be stored in the cluster head. In particular embodiments, some light weight UE context may be transferred from the cluster head to the current source (serving) small cell whenever handover occurs. The light weight UE context transfer may include, for example, the static information and a limited subset of the dynamic information.

In implementations in which the LMA is involved only with the C-plane data, S1-C messages are tunneled from the cluster head to the source small cell. As such, the cluster head and the source small cell may implement a C-plane protocol, such as that of FIG. 16A. As such, there is no data forwarding from the cluster head to the source small cell.

With reference to FIGS. 11-17, in various embodiments, a cluster 1780 (e.g., 1100) can form a large logical eNB. In particular embodiments, a selected small cell, such as a cluster head 1774, which may be selected (but not limited to) as described in the disclosure, may act as a logical eNB (or the like) serving many small cells 1781-1787 (e.g., 1110-1170) in the cluster 1780. Each of the small cells 1781-1787 in the cluster 1780 plays the role of a different logical cell in the logical eNB. Baseband processing may be performed at each of the small cells 1781-1787. Each of the small cells 1781-1787 may have different cell identifiers. In such embodiments, instead of intra-cluster handover (e.g., 1400A of FIG. 14A), intra-eNB handover may be used. Since intra-eNB handovers do not involve any core network signaling, this logical architecture prevents any intra-cluster handover events from generating signaling overhead to a core network component (e.g., the MME 392).

In some instances, there may be a maximum number of cells allowed in the logical eNB (cluster 1780) as defined by a wireless network standard (e.g., 256 cells in an eNB in 3GPP LTE standard). However, if the desired cluster size is less than the maximum number, formation of the cluster may not be restricted.

In some embodiments, the cluster head 1774 is one of the small cells in the cluster 1780. In other embodiments, the cluster head 1774 is not part of the cluster 1780. In some embodiments, the cluster head 1774 is connected to HeNB-GW (e.g., 386 in FIG. 3C) or HNB-GW (e.g., 356 in FIG. 3B). In other embodiments, the cluster head 1774 is integrated with the HeNB-GW or HNB-GW (logical entity). In particular embodiments, the cluster head 1774 may be selected by the core network or the like.

Figure 18:
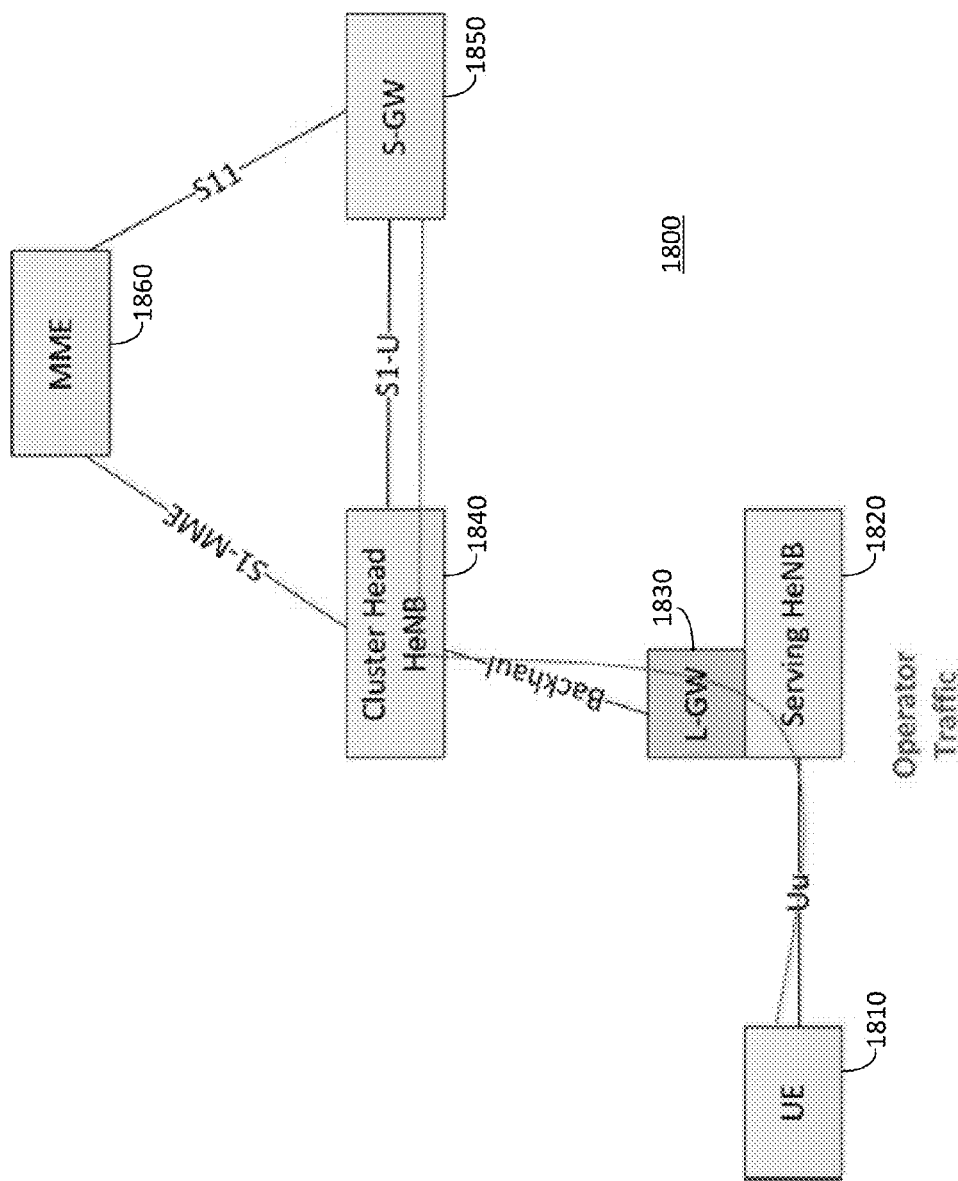
FIG. 18 illustrates a network environment according to various embodiments.

In various embodiments, with respect to FIG. 18, traffic from a UE 1810 (e.g., 360, 380 in FIGS. 3B-3D) via a source (serving) small cell 1820 (e.g., HeNB 388 in FIGS. 3C-3D) can be routed over a local gateway (L-GW) 1830 (e.g., HeNB-GW 386 in FIG. 3C) to a cluster head small cell 1840. Accordingly, user-plane data can be forwarded to a S-GW 1850 (e.g., 394 in FIGS. 3C-3D) via S1-U interface and control-plane data can be forward to an MME 1860 (e.g., 392 in FIGS. 3C-3D) via S1-MME interface.

In various embodiments, messages can be exchanged across small cells of a cluster for enhancing synchronization of cells in the cluster that are not synchronized as well (e.g., currently not receiving sufficiently strong signals from a synchronization source for synchronization). In particular, a small cell may be considered synchronized when the small cell meets predetermined criteria or requirements, for example, according to 3GPP standards. Accordingly, such embodiments, allow unsynchronized small cells (i.e., small cells that do not meet the predetermined requirements) to obtain synchronization information that meets the predetermined requirements.

Figure 19A:
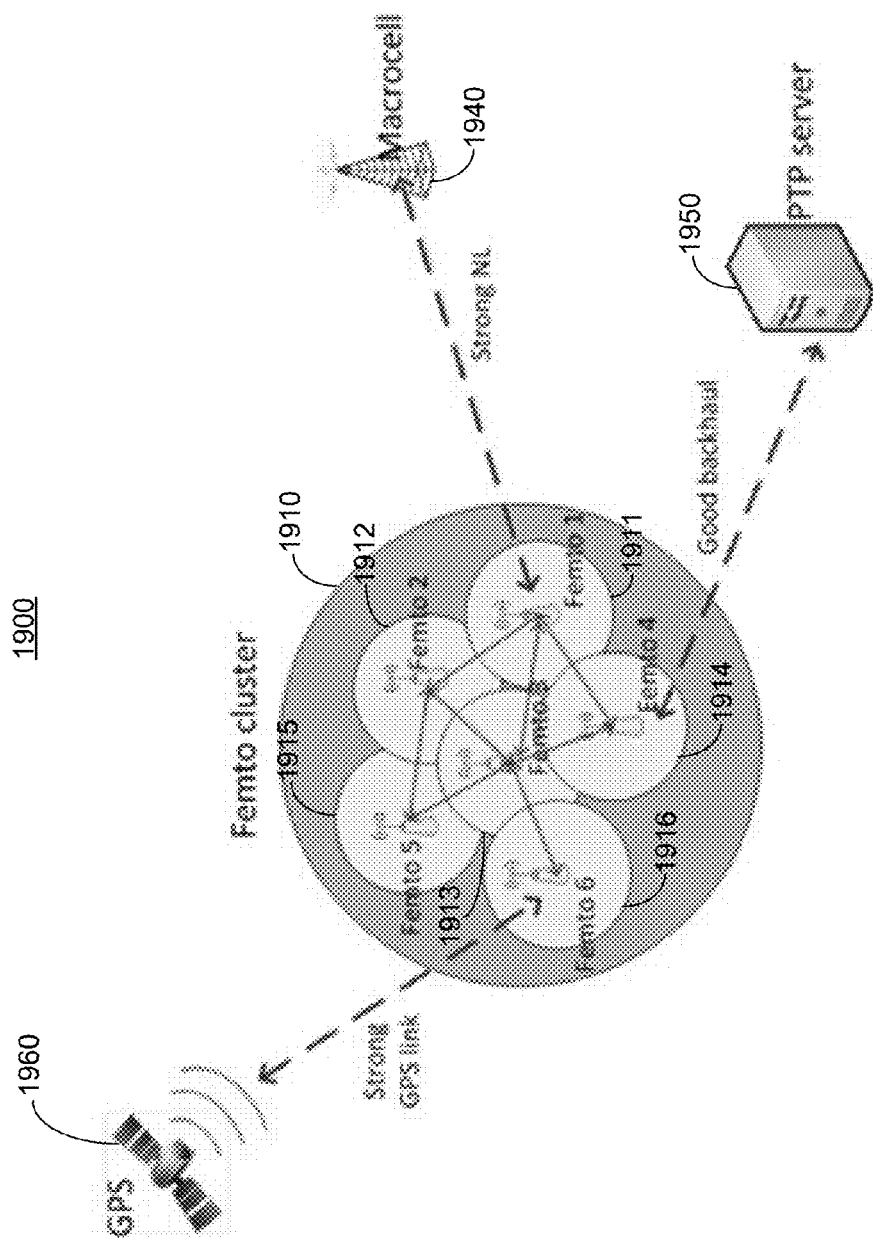
FIG. 19A illustrates a cluster of small cells in a network environment according to various embodiments.
Figure 19B:
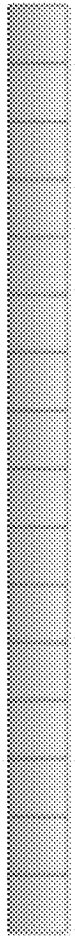
FIG. 19B illustrates timing slots of small cells of a cluster according to various embodiments.

With reference to FIG. 19A-19B, synchronization information can be exchanged between small cells 1911-1916 (e.g., 1110-1170 in FIG. 11) of a cluster 1910 (e.g., 1100 in FIG. 11) for enhancing synchronization of the cells in the cluster 1910 that are not synchronized as well. One or more small cells (e.g., small cells 1911, 1914, and 1916) in the cluster 1910 may be synchronized (i.e., to meet predetermined requirements) based on information from external synchronization sources (e.g. GPS, macrocell or other neighboring small cell, or precision timing protocol (PTP) server, etc.). Such small cells may be considered as having a first synchronization state or being "tightly synchronized."

For example, the small cell 1911 may derive or otherwise obtain precise timing and/or frequency information (synchronization information) via a network listening module of the small cell 1911. The network listening module may be configured to receive signals from neighboring base stations, such as a macrocell 1940 or another small cell to allow the small cell 1911 to derive the synchronization information for synchronizing the small cell 1911. The small cell 1914 may have a backhaul to a precision timing protocol (PTP) server 1950 from which the small cell 1914 can derive or otherwise obtain precise timing and/or frequency information (synchronization information). The small cell 1916 may derive or otherwise obtain synchronization information via signals from a navigation satellite 1960 (e.g., GPS satellite). Thus, according to various embodiments, one or more of the synchronized small cells (e.g., 1911, 1914, 1916) can provide such information (synchronization information) to other cells (e.g., 1912, 1913, 1915) that are unsynchronized (i.e., in a second synchronization state or "loosely synchronized") in the cluster 1910 to assist with synchronization thereof.

In some embodiments, one of the synchronized small cells (i.e., a small cell in the first synchronization state) may be a cluster head. In other embodiments, the cluster head is not one of the synchronized small cells.

For example, suppose the macro cell 1940 sends synchronization signals (via its downlink) in slots 1940A-1940P. The small cell 1911, which may have strong link quality with the macro cell 1940, can silence its downlink transmissions at, for example, slots 1911A, 1911I to allow the synchronization signals to be received from the macro cell 1940 at such slots. Accordingly, based on the synchronization signals sent by the macro cell 1940, the small cell 1911 can derive its synchronization information and thus be in the first state of synchronization. That is, the small cell 1911 may synchronized such that the small cell 1911 meets the predetermined requirements, for example, according to 3GPP standards (3GPP synchronization requirements).

Once in the first state of synchronization, the small cell 1911 may send synchronization signals (via its downlink) in slots 1911B-1911H (and 1911J-1911P). The small cell 1912, which may not have a strong link with the macro cell or other synchronization source, can silence its downlink transmissions at, for example, slots 1912E, 1912M to allow the synchronization signals to be received from the small cell 1911 at such slots. Accordingly, based on the synchronization signals sent by the small cell 1911, the small cell 1912 can derive its synchronization information and thus be in the first state of synchronization (instead of the second state of synchronization).

Because the small cell 1914 has a sufficient backhaul with the PTP server 1950, the small cell 1914 can acquire the synchronization information from the small cell 1914 directly. As such, the small cell 1914 may send synchronization signals (via its downlink) in slots 1914A-1914P. The small cell 1913 can silence its downlink transmissions at, for example, slots 1913A, 1913I to allow the synchronization signals to be received from the small cell 1914 at such slots. Accordingly, based on the synchronization signals sent by the small cell 1914, the small cell 1913 can derive its synchronization information and thus be in the first state of synchronization (instead of the second state of synchronization).

Once in the first state of synchronization, the small cell 1913 may send synchronization signals (via its downlink) in slots 1913B-1913H (and 1913J-1913P). The small cell 1915, which may not have a strong link with the PTP server 1950 or other synchronization source, can silence its downlink transmissions at, for example, slots 1915E, 1915M to allow the synchronization signals to be received from the small cell 1913 at such slots. Accordingly, based on the synchronization signals sent by the small cell 1913, the small cell 1915 can derive its synchronization information and thus be in the first state of synchronization (instead of the second state of synchronization).

In some embodiments, a lightly loaded small cell that is in the first state of synchronization, such as the small cell 1916, may be configured to suspend transmissions to measure and report synchronization offsets (e.g., frequency and/or timing offsets) to an unsynchronized small cell (i.e., in the second state of synchronization), such as the small cell 1913 (and/or other small cell in the cluster). In particular embodiments, a lightly loaded small cell is a small cell that is not serving any UEs or the like. For instance, the small cell 1916 may silence its downlink transmissions at, for example, slots 1916C, 1916G, 1916K, 1916O to listen to (receive) the synchronization signals of the small cell 1913. The small cell 1916 may compare the synchronization signals of the small cell 1913 with the synchronization information of the small cell 1916 to derive a synchronization offset. The small cell 1916 may then send the synchronization offset to the small cell 1913 to allow the small cell 1913 to derive more precise synchronization information. The synchronization offset may be transmitted from the small cell 1916 to the small cell 1913 in any suitable manner (e.g., as described with respect to FIGS. 6-8). The synchronization offset may be transmitted, for example, over the air, backhaul, or the like. If transmitted over the air, the synchronization offset may be part of transmitted control information. Transmission time of the control information may be scheduled by a scheduler of the small cell 1916.

Thus, according to various embodiments, a small cell (e.g., 1911) in the cluster 1910 has a synchronization source (e.g., the macro cell 1940) and is considered synchronized (i.e., in the first state of synchronization). This may be based on one or more metrics (e.g., timing and frequency error accuracy), for instance, as required by 3GPP standards or the like. Next, the synchronized small cell advertises its synchronization information to the other small cells in the cluster 1910. Accordingly, the synchronized small cell may be used to synchronize unsynchronized small cells in the cluster 1910. For example, in some embodiments, the synchronized small cells may assist the unsynchronized small cells when the synchronized small cells are not serving a UE. For instance, the synchronized small cells may measure the frequency and timing offset of its neighbor small cells and communicate a synchronization offset to the respective small cell to synchronize those small cells.

Figure 20A:
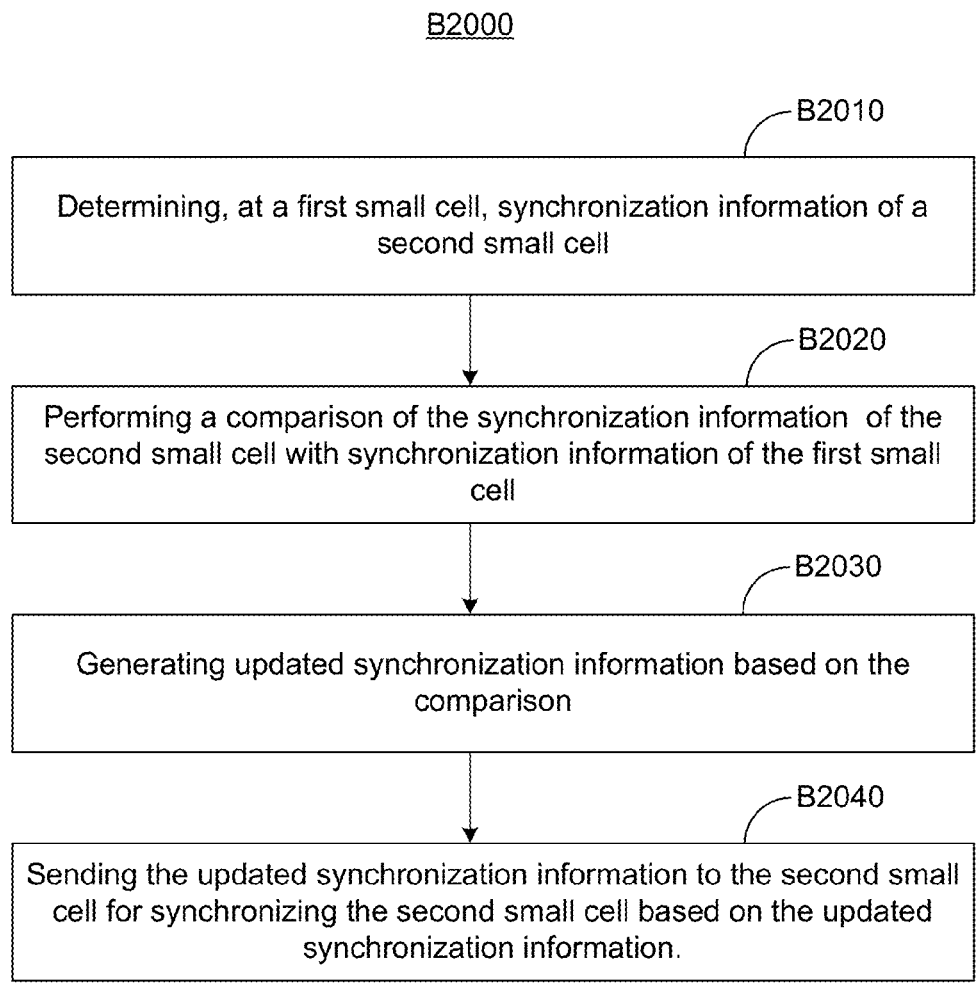
FIGS. 20A-20B illustrate a flowchart of a method for synchronizing a small cell of a cluster according to various embodiments.

For example, FIG. 20A is a flow chart of a method B2000 of synchronizing a small cell in a cluster. For instance, with reference to FIGS. 19A-20A, suppose a first small cell (e.g., 1911) is synchronized, for example because of a connection with a synchronization source, and a second small cell (e.g., 1912) is unsynchronized. As such, the method B2000 may include at block B2010, determining, at the first small cell, synchronization information of the second small cell. The determining may include receiving, at the first small cell, the synchronization information from the second small cell. In other embodiments, the determining may include receiving, at the first small cell, at least one signal from the second small cell, and determining (e.g., estimating) the synchronization information of the second small cell based on the at least one signal.

At block B2020, the method may include performing a comparison of the synchronization information of the second small cell with synchronization information of the first small cell. Then at block B2030, the method may further include generating updated synchronization information (e.g., offset information) based on the comparison and, at block B2040, sending the updated synchronization information to the second small cell for synchronizing the second small cell based on the updated synchronization information.

According to various embodiments, the burden of measuring timing offsets is shifted to the synchronized small cell (e.g., the first small cell). This may be useful when the unsynchronized small cell (e.g., the second small cell) has active UEs, but the synchronized small cell has none. In addition or in the alternative, this may be useful when the synchronized small cell may be deriving its synchronization from a source that is not via network listening (e.g., GPS or PTP-based backhaul). In this case, the synchronized small cell may use its network listen gaps for helping the unsynchronized small cell.

In various embodiments, other small cells may be updated in a similar manner. For example, a third small cell that belongs to a same cluster of the second small cell may be updated based on the updated synchronization information. The updated synchronization information may be provided by the second small cell. In other embodiments, the updated synchronization information may be provided by the first small cell. In some embodiments, once the second small cell is synchronized (e.g., based on the updated synchronization information), the second small cell may send synchronization information to the third small cell to allow the third small cell to synchronize based on the synchronization information.

Figure 20B:
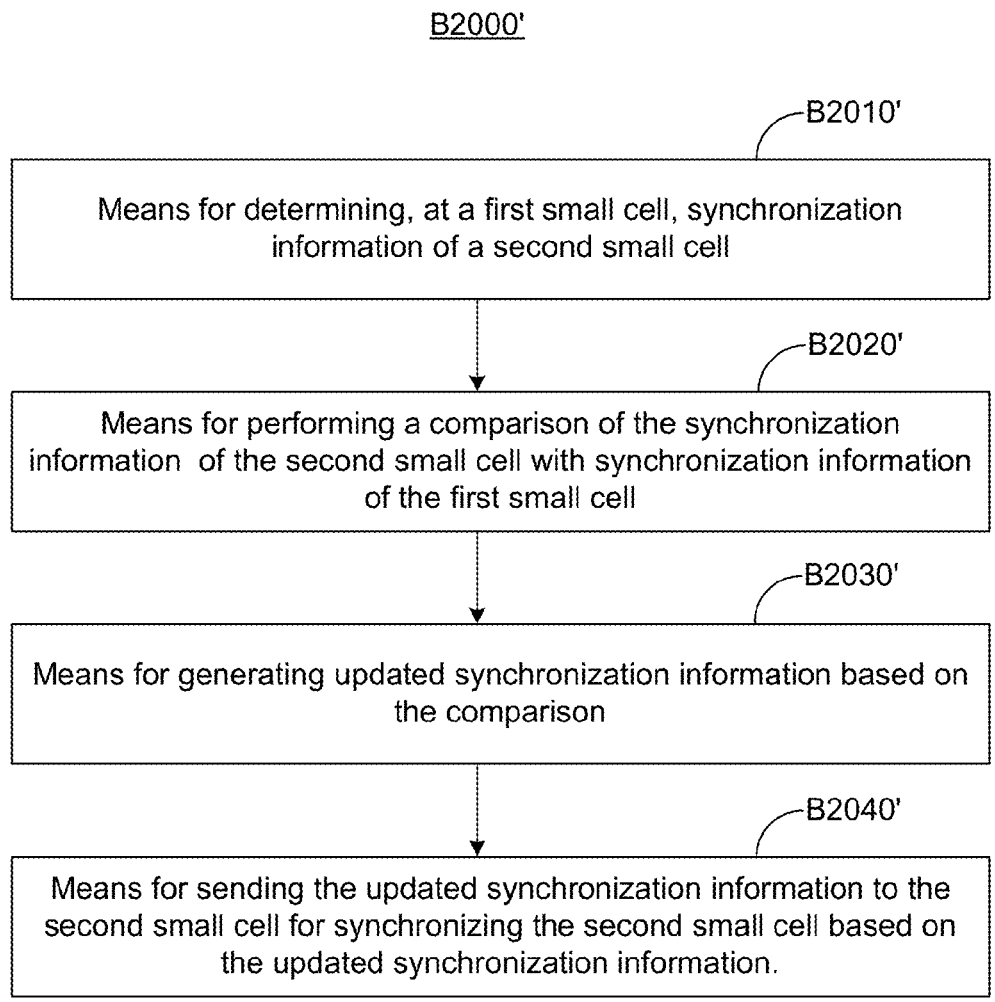

The method B2000 described in FIG. 20A above may be performed by various hardware and/or software component(s) and/or module(s) corresponding to the means-plus-function blocks B2000' illustrated in FIG. 20B. In other words, blocks B2010 through B2040 illustrated in FIG. 20A correspond to means-plus-function blocks B2010' through B2040' illustrated in FIG. 20B.

With reference to FIGS. 1-20B, in various embodiments, the cluster head may be configured for performing spectrum coordination (in time, frequency, geography etc.) of the small cells within the cluster. For instance, systems such as, Authorized Shared Access (ASA), share access by licensees in a primary user's underutilized spectrum time, frequency, and geographical domains. According to various embodiments, the cluster head may be coupled between an OAM entity (e.g., 376) and the small cells of the cluster (rather than the OAM entity being directly coupled to the individual small cells). As such, the cluster head may share spectrum coordination information from the operator OAM to the small cells of the cluster. In some embodiments, the cluster head can collect spectrum coordination information from the small cells, for example, relating to spectrum utilization of each of the cells and send this information to the operator OAM. This information, for example, may be then pushed to an ASA controller or the like.

In some embodiments, spectrum coordination can be performed by clusters (e.g., via respective cluster heads) of different operators, for example a first cluster (operating on frequency F1) operated by Operator A and a second cluster operated (operating on a frequency F2) by Operator B. For instance, the coordination may maximize utilization of each operator's spectrum (including where guard bands between F1 and F2 would be provided) for small cell operation without leakage into adjacent channels occupied by other operators. In particular embodiments, a cluster may be formed of small cells of the same operator. In some embodiments, a cluster may be formed of small cells from various operators.

It should be noted that any one or more of the embodiments described in the disclosure may be combined with any one or more other embodiments described in the disclosure.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to anyone or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95, and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an UltraMobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some embodiments, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method of coordinating a small cell with a plurality of small cells,
    the method comprising:
    estimating backhaul bandwidth and backhaul bandwidth utilization of the small cell;
    estimating aggregate bandwidth utilization for the small cell and the plurality of small cells based on the estimated backhaul bandwidth utilization for each of the plurality of small cells;
    selecting, for a first application, a first cluster head for a cluster including at least some of the plurality of small cells, wherein the backhaul bandwidth of the first cluster head supports an estimated aggregate backhaul bandwidth utilization of the cluster;
    selecting, for a second application, a second cluster head for the cluster, wherein the backhaul bandwidth of the second cluster head supports the estimated aggregate backhaul bandwidth utilization of the cluster, wherein the first application is different from the second application;
    utilizing the first cluster head as a first intra-cluster path switch to relay first data packets for the first application between the other small cells of the cluster and a network entity; and
    utilizing the second cluster head as a second intra-cluster path switch to relay second data packets for the second application between the other small cells of the cluster and the network entity.

2. The method of claim 1, wherein at least one of the first cluster head and the second cluster head is selected based on the estimated aggregate backhaul bandwidth utilization and at least one of (i) backhaul delay between the small cell and the other small cells of the cluster, (ii) a number of hops between the small cell and the other small cells of the cluster, (iii) a maximum allowed size of the cluster, and (iv) a number of user equipment context transfers between the small cell and the other small cells of the cluster.

3. The method of claim 1, wherein the network entity comprises a core network.

4. The method of claim 1, wherein the first and second data packets are communicated for the first and second applications each relating to one of (i) filtering key performance indicator for the small cells in the cluster, (ii) providing a local mobility anchor for the small cells in the cluster, (iii) time and/or frequency synchronization of the small cells in the cluster, and (iv) spectrum coordination of the small cells in the cluster.

5. The method of claim 1, wherein the estimated aggregate backhaul bandwidth utilization includes one of (i) control-plane data and (ii) control-plane data and user-plane data.

6. A method of coordinating among a plurality of small cells, the method comprising:
    forming a cluster from the plurality of small cells, the cluster including at least some of the plurality of small cells;
    selecting, for a first application, a first cluster head for the cluster, wherein a backhaul bandwidth of the first cluster head supports an aggregate backhaul demand of the cluster;
    selecting, for a second application, a second cluster head for the cluster, wherein a backhaul bandwidth of the second cluster head supports the aggregate backhaul demand of the cluster;
    utilizing the first cluster head as a first intra-cluster path switch to relay first data packets for the first application between the other small cells of the cluster and a network entity; and
    utilizing the second cluster head as a second intra-cluster path switch to relay data packets for the second application between the other small cells of the cluster and the network entity.

7. The method of claim 6, wherein at least one of the first cluster head and the second cluster head is selected based on one or more criteria including at least one of (i) aggregate backhaul bandwidth utilization of the cluster; (ii) backhaul delay between the small cell and the other small cells of the cluster, (iii) a number of hops between the small cell and the other small cells of the cluster, (iv) a maximum allowed size of the cluster, and (v) a number of user equipment context transfers between the small cell and the other small cells of the cluster.

8. The method of claim 6, wherein the network entity comprises a core network.

9. The method of claim 6, wherein the aggregate backhaul demand of the cluster includes one of (i) control-plane data and (ii) control-plane data and user-plane data.

10. The method of claim 6, wherein at least one of the first application and the second application relates to one of (i) filtering key performance indicator for the small cells in the cluster, (ii) providing a local mobility anchor for the small cells in the cluster, (iii) time and/or frequency synchronization of the small cells in the cluster, and (iv) spectrum coordination of the small cells in the cluster.

11. A method of coordinating a small cell with a plurality of small cells, the method comprising:
- estimating backhaul bandwidth and backhaul bandwidth utilization of the small cell;
- estimating aggregate bandwidth utilization for the small cell and the plurality of small cells based on the estimated backhaul bandwidth utilization for each of the plurality of small cells;
- selecting, for a first application, a first cluster head for a cluster including at least some of the plurality of small cells, wherein the backhaul bandwidth of the first cluster head supports an estimated aggregate backhaul bandwidth utilization of the cluster;
- selecting, for a second application, a second cluster head for the cluster, wherein the backhaul bandwidth of the second cluster head supports the estimated aggregate backhaul bandwidth utilization of the cluster, wherein each of the first application and the second application relates to one of (i) filtering key performance indicator for the small cells in the cluster, (ii) providing a local mobility anchor for the small cells in the cluster, (iii) time and/or frequency synchronization of the small cells in the cluster, and (iv) spectrum coordination of the small cells in the cluster, and wherein the first application is different from the second application;
- utilizing the first cluster head as a first intra-cluster path switch to relay first data packets for the first application between the other small cells of the cluster and a network entity; and
- utilizing the second cluster head as a second intra-cluster path switch to relay second data packets for the second application between the other small cells of the cluster and the network entity.

* * * * *